(12) United States Patent
Wood et al.

(10) Patent No.: US 12,276,632 B2
(45) Date of Patent: Apr. 15, 2025

(54) OPERANDO CHEMICAL AND/OR ELECTROCHEMICAL TESTING CELL

(71) Applicant: SAN DIEGO STATE UNIVERSITY (SDSU) FOUNDATION, San Diego, CA (US)

(72) Inventors: Kevin Wood, San Diego, CA (US); Aleksandr Aleshin, San Diego, CA (US)

(73) Assignee: SAN DIEGO STATE UNIVERSITY (SDSU) FOUNDATION, San Diego, CA (US)

(*) Notice: Subject to any disclaimer, the term of this patent is extended or adjusted under 35 U.S.C. 154(b) by 313 days.

(21) Appl. No.: 17/797,848

(22) PCT Filed: Feb. 5, 2021

(86) PCT No.: PCT/US2021/016944
§ 371 (c)(1),
(2) Date: Aug. 5, 2022

(87) PCT Pub. No.: WO2021/159012
PCT Pub. Date: Aug. 12, 2021

(65) Prior Publication Data
US 2023/0055246 A1      Feb. 23, 2023

Related U.S. Application Data

(60) Provisional application No. 62/971,772, filed on Feb. 7, 2020.

(51) Int. Cl.
| G01N 27/28 | (2006.01) |
| G01N 21/09 | (2006.01) |
| G01N 27/416 | (2006.01) |

(52) U.S. Cl.
CPC .......... *G01N 27/283* (2013.01); *G01N 21/09* (2013.01); *G01N 27/416* (2013.01)

(58) Field of Classification Search
None
See application file for complete search history.

(56) References Cited

U.S. PATENT DOCUMENTS

| 6,015,479 A * | 1/2000 | Boss ................... G01N 27/404 356/318 |
| 2014/0346052 A1 | 11/2014 | Ozaki et al. |
| 2019/0187059 A1 | 6/2019 | Horn et al. |
| 2019/0204194 A1 | 7/2019 | Zhao et al. |

OTHER PUBLICATIONS

Benck et al., "Apparatus fo Operando x-ray diffraction of fuel elctrodes in high temperature solid oxide electrochemical cells" Review of Scientific Instruments Journal, Feb. 15, 2018.

* cited by examiner

*Primary Examiner* — J. Christopher Ball
(74) *Attorney, Agent, or Firm* — Gregory P. Einhorn; Greer, Burns & Crain, Ltd.

(57) ABSTRACT

A test cell for operando testing comprises: a housing assembly defining at least a portion of an inner chamber; a window coupled to said housing assembly and defining another portion of the inner chamber; and at least one port for accommodating an electrode and/or conductive wire in communication with the inner chamber. The inner chamber is configured for receiving one or more samples undergoing a chemical and/or electrochemical reaction therein. The port is sealable to hermetically seal the inner chamber.

19 Claims, 32 Drawing Sheets

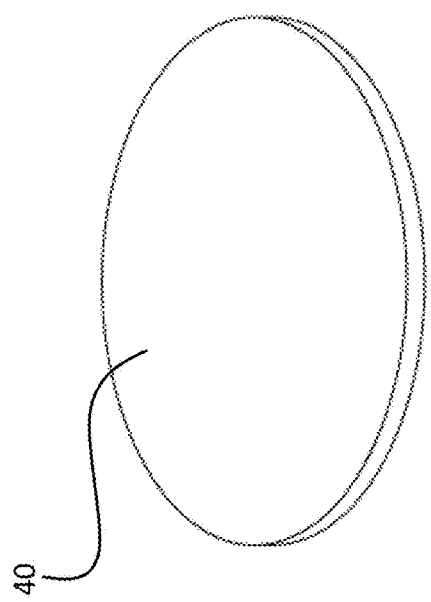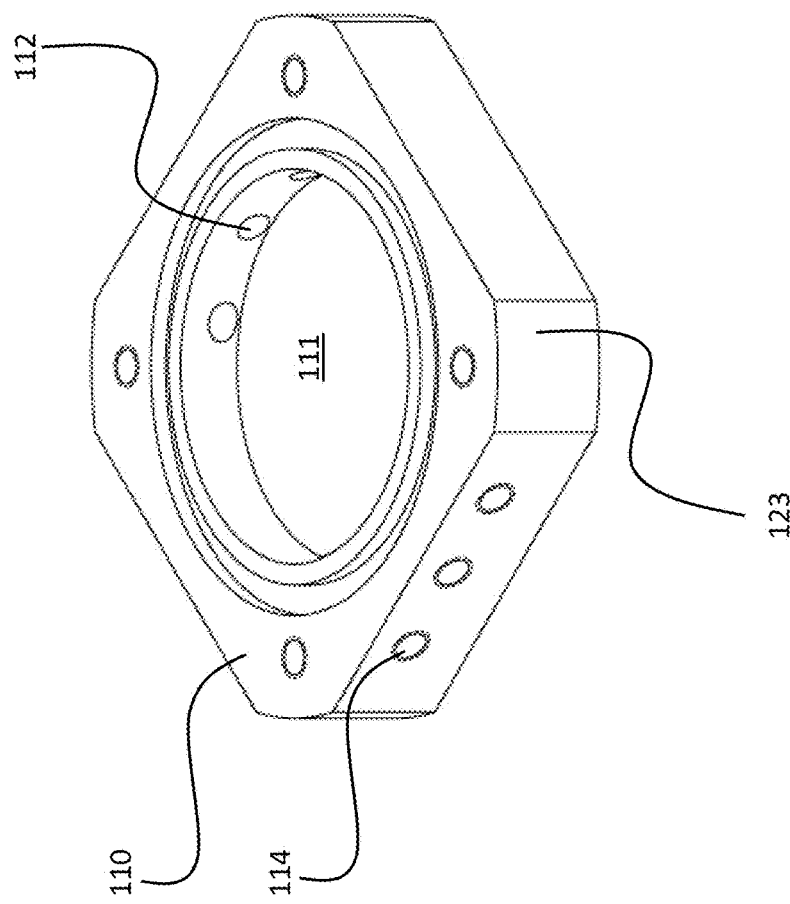
FIG. 9

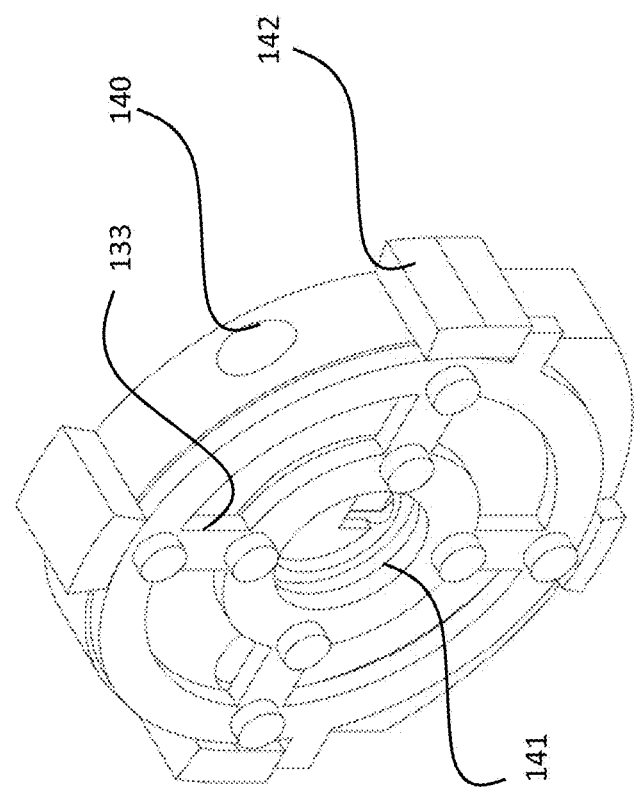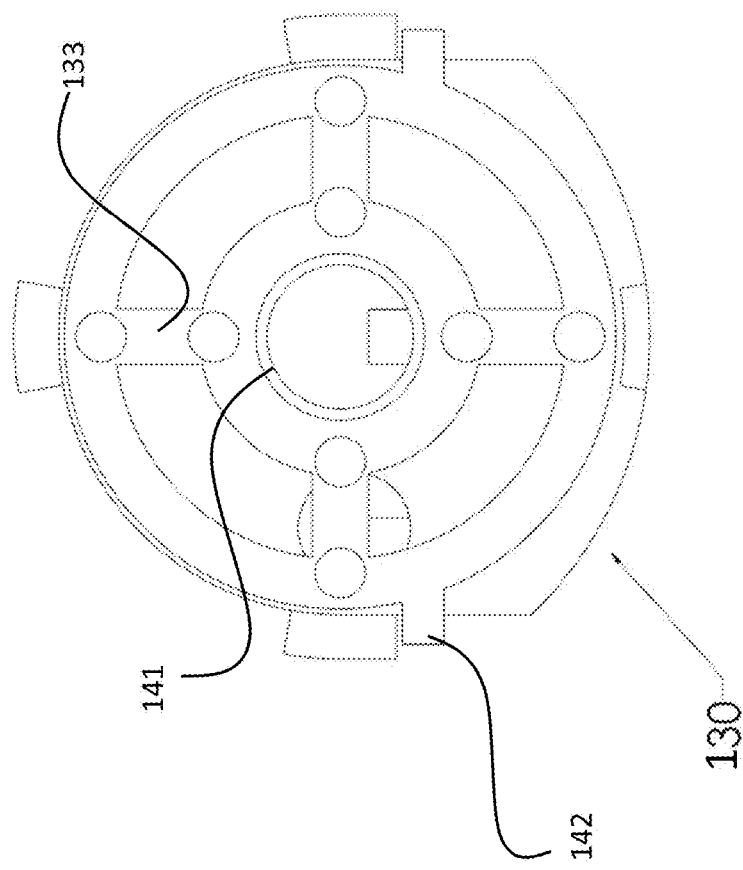
FIG. 14

OPERANDO CHEMICAL AND/OR ELECTROCHEMICAL TESTING CELL

RELATED APPLICATIONS

This U.S. National Phase Patent Application claims benefit of priority under 35 U.S.C. § 371 to Patent Convention Treaty (PCT) International Application PCT/US2021/016944, filed Feb. 5, 2021, now pending, which claims the benefit of priority under 35 U.S.C. § 119 (e) of U.S. Provisional Patent Application Ser. No. 62/971,772, filed Feb. 7, 2020, now pending. The aforementioned applications are expressly incorporated herein by reference in their entirety and for all purposes. All publications, patents, patent applications cited herein are hereby expressly incorporated by reference for all purposes.

FIELD

The present disclosure relates generally to the field of monitoring and analysis of systems. Embodiments of the invention relate more particularly to methods and systems for simultaneous monitoring and/or analysis of electrochemical, chemical, and morphological changes that can occur during an operation of chemical and/or electrochemical systems.

BACKGROUND

It is desirable in many fields to analyze electrochemical, chemical, structural, and morphological changes that can occur during an operation of chemical and/or electrochemical systems, such as but not limited to a chemical or electrochemical reaction. Analysis can include, for instance, spectroscopic analysis in combination with other assessments.

While for some applications it can be sufficient to provide such assessments in situ, for many other applications it is highly preferable or even necessary to provide a spectroscopic characterization of materials undergoing reaction simultaneously with one or more measurements of activity and/or selectivity. Examples of such applications include, among other things, simultaneous analysis of electrochemical, chemical, and morphological changes that can occur during an operation of chemical and/or electrochemical systems. Spectroscopic changes that may be monitored include, but are not limited to, the formation and disappearance of intermediate species at an active site of a reaction as bonds are made and/or broken, active sites of a catalyst being studied, spectator species, etc.

Such simultaneous analysis may be possible using operando testing systems and methods. Among other applications, operando analysis is crucial for understanding the fundamental behavior of complex and dynamic systems including, but not limited to, batteries, fuel cells, water splitting, and catalysts.

It is important to assess activity in a comparable environment (pressure, temperature, etc.) to those of such reactions without undesirably altering the measuring instruments or their readings. However, current state-of-the-art operando testing cells (test cells) capable of being used for such simultaneous analysis are undesirably thick and have limited analysis regions. As a result, most analytic techniques are not usable with current state-of-the-art test cell designs.

US 2012/0019253 discloses measuring the impedance of a battery cell to determine the deterioration and aging of the battery. Other applications are related to batteries or diagnostic methods.

WO 2018/060281 A1, "Electrochemical Cell Testing Device," discloses a device for analyzing the electrochemical aspects of some cells.

U.S. Pat. No. 9,274,059 discloses a microfluidic device for observing electrolyte solution that does not allow for direct observation of the battery itself.

EP 3336953 A1 discloses an encasing for an electrochemical cell for the study of the reaction mechanisms occurring in electrochemical cells.

SUMMARY

According to one aspect of the disclosed embodiments, a test cell for operando testing comprises: a housing assembly defining at least a portion of an inner chamber; a window coupled to said housing assembly and defining another portion of the inner chamber; and at least one port for accommodating an electrode and/or wire conductor disposed partially within the inner chamber. The inner chamber is configured for receiving one or more samples undergoing a chemical and/or electrochemical reaction therein. The port is sealable to hermetically seal the inner chamber. Various example test cells are disclosed herein.

According to another aspect of the disclosed embodiments, an operando system comprises: a test cell as disclosed herein; at least one analysis instrument coupled to one or more of the electrodes; and one or more of a camera or a microscope trained on the window to view at least one chemical or electrochemical reaction inside the inner chamber.

Other features and advantages of the invention will be apparent from the following specification taken in conjunction with the following drawings.

DESCRIPTION OF THE DRAWINGS

The present disclosure will become more fully understood from the detailed description and the accompanying drawings, wherein:

FIG. 9 shows perspective views of an example test cell base and optical/x-ray window of the example test cell shown in FIGS. 5-7;

FIG. 14 shows plan (left) and perspective (right) views of the modular insertable electrode/sample holder of FIG. 13.

FIG. 22 shows in-situ Raman mapping, and FIG. 23 shows example spectral data (Raman shift vs. intensity) collected using this example design.

FIG. 31 shows spectral data, and FIG. 32 shows mapping data.

In the drawings, reference numbers may be reused to identify similar and/or identical elements.

DETAILED DESCRIPTION

Figure 1:
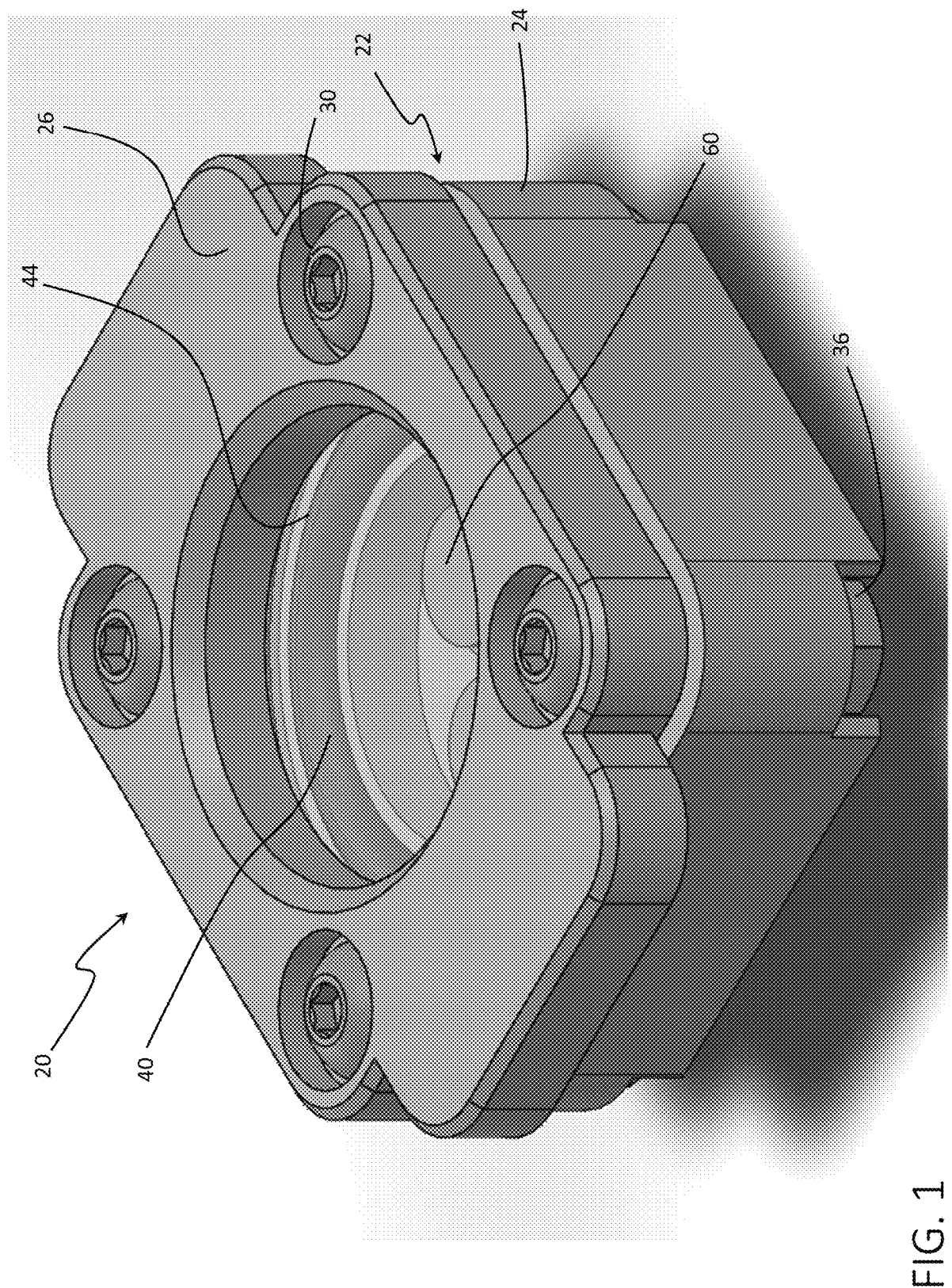
FIG. 1 is a perspective view of an example test cell according to a first embodiment.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

Embodiments of the invention provide, among other things, operando testing systems and methods including operando testing cells (test cells) that can be significantly thinner than existing designs and allow for new forms of analysis. Example test cells provided herein can enable a minimum cell thickness of, for instance, 12 mm, and allow for multiple cell geometries with large analysis regions. As such, example test cells can be used for various analysis capabilities, including new capabilities heretofore not possible with existing test cells.

Example embodiments enable, among other things, simultaneous analysis of electrochemical, chemical, and/or morphological changes that can occur during an operation of chemical and/or electrochemical systems. This type of analysis is crucial for understanding the fundamental behavior of complex and dynamic systems. Such systems include, but are not limited to, batteries, fuel cells, water splitting, and catalysts.

Example test cells disclosed herein can be used in connection with a disparate range of analytical techniques including, but not limited to optical microscopy, gas chromatography, Raman spectroscopy, infrared (IR) spectroscopy, laser profilometry, and x-ray diffraction (XRD).

Presently, there are many mechanistic questions regarding chemical and electrochemical reactions at the microscopic level. Example embodiments disclosed herein can provide a "window" into complex chemical and electrochemical reactions that occur in systems such as but not limited to batteries. For example, a test cell can be provided to analyze electric vehicle battery cells in real-time with high-definition photos. Improved techniques and devices for analyzing battery cells are useful for better understanding batteries, such as but not limited to those used in electric vehicles, which can help scientists and engineers design improved batteries for commercial applications. Looking inside a system such as a battery, for instance, allows researchers to better understand what can go wrong and how to best fix the problem.

Measuring aspects of systems and analyzing how they operate is essential to scientific inquiry and engineering. In the case of a battery for an electric vehicle (EV), for instance, scientists and engineers must not only know the voltage, power, and life of a battery, but what can change those aspects of the battery and why. By understanding what is occurring internally in the battery, engineers can create better batteries that provide more power, last longer, and behave more efficiently. Devices to enhance this understanding have both research and commercial value.

Central to understanding what is happening in an EV battery and many other systems is understanding the behavior of electromagnetic radiation in the system. Electromagnetic radiation (EMR) is the set of waves that carry many types of energy through space. Types of electromagnetic waves include radio waves, X-rays, and visible light.

Generally, spectroscopy is the study of how EMR reacts with matter, including how EMR behaves in systems such as but not limited to EV batteries. Operando spectroscopy in such applications is a form of analysis that studies the behavior of EMR in a system at the same time as other aspects of the system, such as (but not limited to) its electrical or chemical behavior. In other words, it is a method to observe a device in actual working conditions.

Some embodiments of the invention provide, among other things, a test cell and method of using the test cell as an operando spectroscope for electrochemical systems such as EV batteries. However, such example devices are suitable for many other systems such as but not limited to hydrogen fuel cells, water splitting, and other systems relying on catalysis.

Example test cells include a unique housing assembly to provide suitability for particular operando environments. An example operando system for electrochemical systems such as but not limited to EV batteries includes a test cell in combination with an optical microscope, a camera, such as but not limited to a high-definition camera, and (optionally) one or more additional measuring devices. Examples of other measuring techniques accommodated by measuring devices of example test cells include, but are not limited to, gas chromatography, Raman spectroscopy, infrared (IR) spectroscopy, laser profilometry, and x-ray diffraction (XRD). Other examples are provided herein.

A computer including a processor, memory, and one or more inputs (e.g., input ports) may be further provided as part of or in addition to the operando system and in communication with (e.g., coupled wired and/or wirelessly to receive and/or transmit signals) the optical microscope, camera, and/or additional measuring devices to receive, collect, and integrate, synchronize, and/or analyze the collected data. In some example embodiments, the computer or a different computer can be configured to output a graphical dashboard or other suitable interface to view the collected and/or analyzed operando data, pictures, and/or video. Additional analytical equipment may be provided for performing particular analysis depending on the phenomenon to be assessed the measuring devices used for the same.

An example test cell includes a housing assembly having a window to view, for instance, the interior of a battery cell. Housing assemblies for test cells can be configured to accommodate multiple cell geometries. Cell walls of some example test cell housing assemblies preferably provide larger areas of analysis than in existing operando test cells.

Some example test cells herein further include a modular insertable electrode and/or sample holder (electrode/sample holder) that can be configured (e.g., designed and fabricated) separately from the remainder of the test cell for insertion into the housing assembly. Multiple modular electrode/sample holders can be provided, and suitable ones can be selected and inserted into the housing assembly for testing and/or analysis. Such electrode/sample holders can vary in design, materials, etc. to optimize suitability for particular uses.

In an example use of the operando system, the test cells can be used to acquire data and video of a reaction (such as in a battery cell) during operation. With such operando observations, more can be measured and understood about the desired reaction, enabling the rational design of the system of interest.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Figure 2:
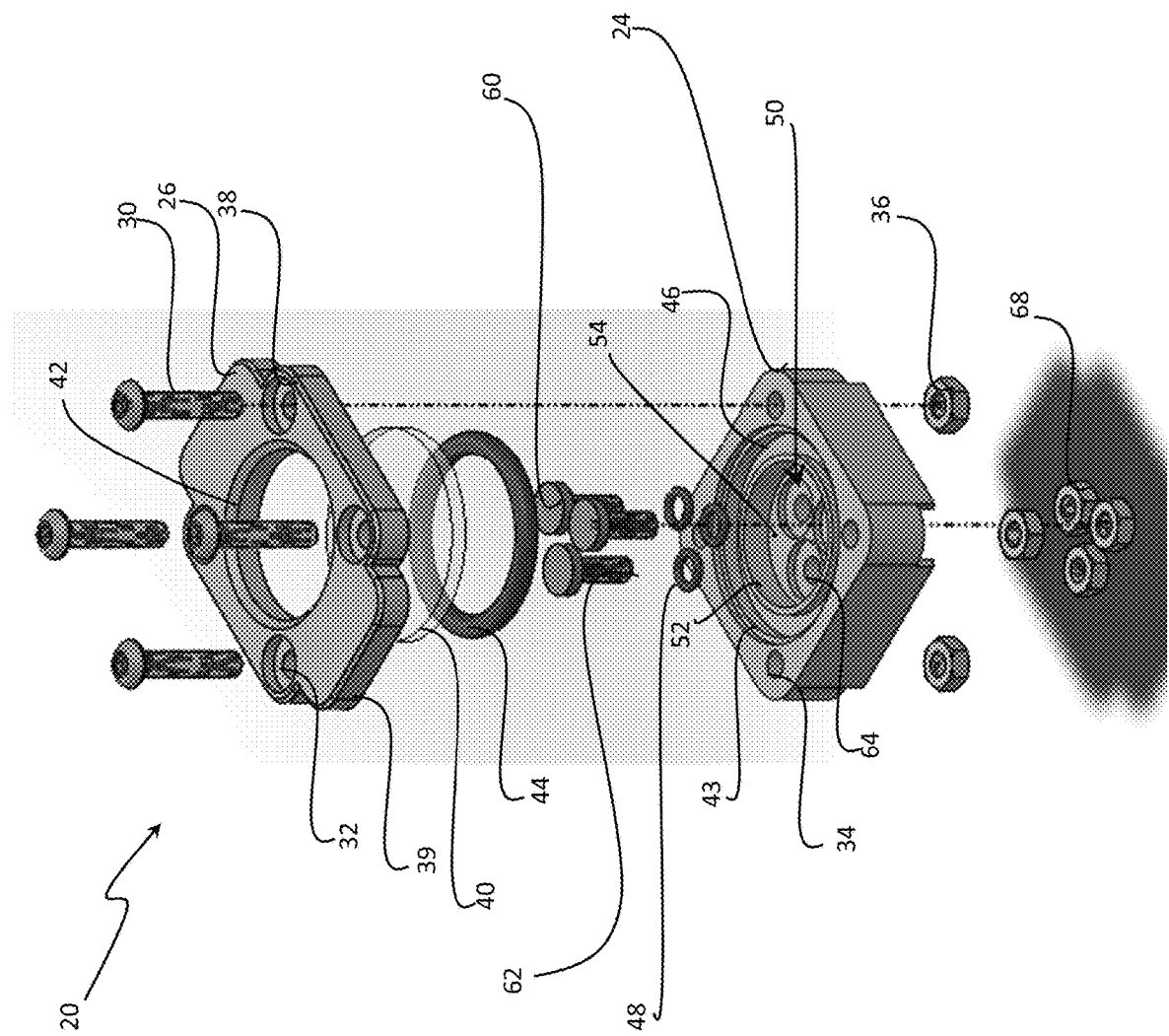
FIG. 2 is an exploded perspective view of the example test cell of FIG. 1.

FIGS. 1-2 show an example test cell 20, which can provide or be incorporated in a modular operando testing system. The test cell 20 includes a housing assembly 22 including a lower base portion 24 connected (e.g., removably mounted) to an upper portion (cell top) 26. "Upper" and "lower" refers to the orientation of the test cell 20 shown in FIGS. 1-2. The lower base portion 24 and/or cell top 26 are preferably made of one or more rigid materials such as, but not limited to, polylactic acid (PLA) plastic, polyether ether ketone (PEEK) plastic (e.g., for corrosive environments), and/or metal (e.g., for accommodating higher temperatures). Example metals include but are not limited to stainless steel, a particular example being 316 stainless steel.

In an example embodiment, the lower base portion 24 and the cell top 26 are removably mounted to one another via one or more attachment devices such as fasteners, e.g., bolts 30. The bolts 30 extend through passages 32 in the cell top 26 and through aligned passages 34 in the lower base portion 24 to engage with nuts 36. Passages 32 include seats 38 for accommodating heads of the bolts 30 and/or seals.

In the test cell 20, the lower base portion 24 is generally rectangular, for instance square, in planar shape, while the cell top 26 is generally rectangular and having a square interior portion to align with the lower base portion 24. The lower base portion 24 further include outer portions, e.g., wings 39. However, in other embodiment test cells, such as those disclosed elsewhere herein, the wings 39 can be omitted. Example dimensions for the lower base portion 24 and cell top 26 can provide, as a nonlimiting example, test cell areas/volumes of 10 mm tall×40 mm×40 mm l/w), or even smaller. This allows multiple, e.g., 4-5 or more, example test cells 20, to fit within some environments that are typically accommodated by the size of individual conventional test cells.

A window 40, which is preferably at least translucent, and may be partially or fully transparent, to electromagnetic radiation (EMR) can be made of fused silica, borosilicate glass, quartz calcium fluoride, sapphire, Kapton, or other materials. In some embodiments, the window 40 is configured to provide an optically (e.g., visible light, infrared light, ultraviolet light, x-ray, etc. or combinations) translucent or transparent window. An outer portion of the window 40 can be at least partially received by and/or enclosed between a seat formed within an inner portion 42 of the cell top 26 and a seat 43 formed within the lower base portion 24. A seal 44, such as an O-ring, made of a suitable sealing material such as an elastomer (e.g., Kalrez, FEP, Viton, or other elastomers), PTFE, metal (e.g., 316 stainless steel, etc.), etc., is disposed between the lower base portion 24 and upper frame 26 and can be at least partially received by a (e.g., circular) channel 46 in the lower base portion.

An inner chamber 50 of the test cell 20 can be enclosed by and defined within portions of the housing assembly 22, such as by an inner wall 52 and a lower surface 54 of the lower base portion 24, as well as on an upper surface by an underside of the window 40 when the test cell 20 is assembled. Alternatively or additionally, the inner chamber 50 can be defined by one or more portions of the cell top 26.

The inner chamber 50 is preferably hermetically sealed (that is, airtight, watertight, etc.) by the portions of the test cell enclosing the inner chamber; e.g., for the test cell 20 the lower base portion 24, cell top 26, window 40, and/or seal 44 defining the inner chamber, as well as by sealing inlets/outlets to the test cell, as explained in more detail herein. Hermetically sealing the inner chamber 50 allows the test cell 20 to be used in various environments, such as but not including vacuum environments, without leaking (or substantially leaking). This in turn allows for low profile test arrangements as well as safe and reliable operation outside of an inert environment. Further, providing hermetically sealed test cells enables capabilities including various measurement techniques, sensors, fluid/solid flow, etc.

Housed within the inner chamber 50 are a plurality of (as shown in the example test cell 20, three) electrode holders 60 each having one or more electrodes 62 extending therethrough. The electrodes 62 are in communication with the inner chamber 50. For example, the electrodes 62 may provide coupling (e.g., signal coupling) to one or more measuring devices (not shown) that may be disposed within the inner chamber 50 and/or to external measurement and/or analysis devices (including but not limited to a computer or other processor) to collect data generated from within the inner chamber. Example measuring devices include potentiostat, lock-in amplifier, etc.

The example electrode holders 60 in the test cell 20 are embodied in stainless steel, copper, or similar material that extend through lower ports 64 disposed at a bottom of the inner chamber 50 and hermetically seal with O-rings 48. The lower ports 64 allow for the introduction of various measuring and observing capabilities as needed or desired for the particular assessment, while the electrode holders 60 help retain the hermetic seal within the inner chamber 50. The electrode holders 60 can include threaded outer surfaces that engage with complementary threaded inner surfaces of fasteners 68 to seal the ports 64. Unused ports can be easily and reliably sealed using fasteners to retain a hermetic seal.

The example inner chamber 50 is circular, which provides symmetry for one or more ports 64 connecting outside devices to the inner chamber. However, other shapes are possible.

Figure 3:
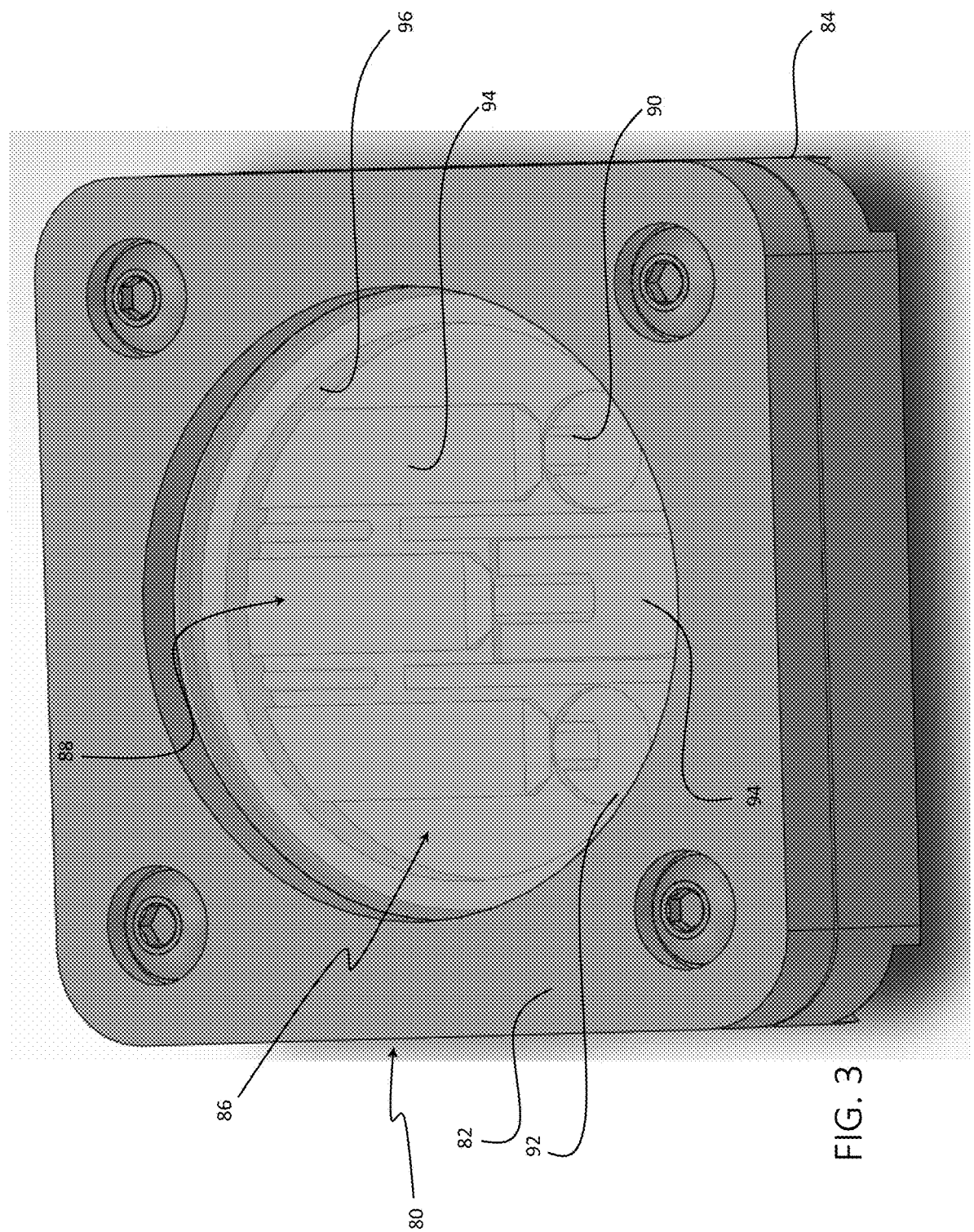
FIG. 3 is a perspective view of an example test cell according to a second embodiment.
Figure 4:
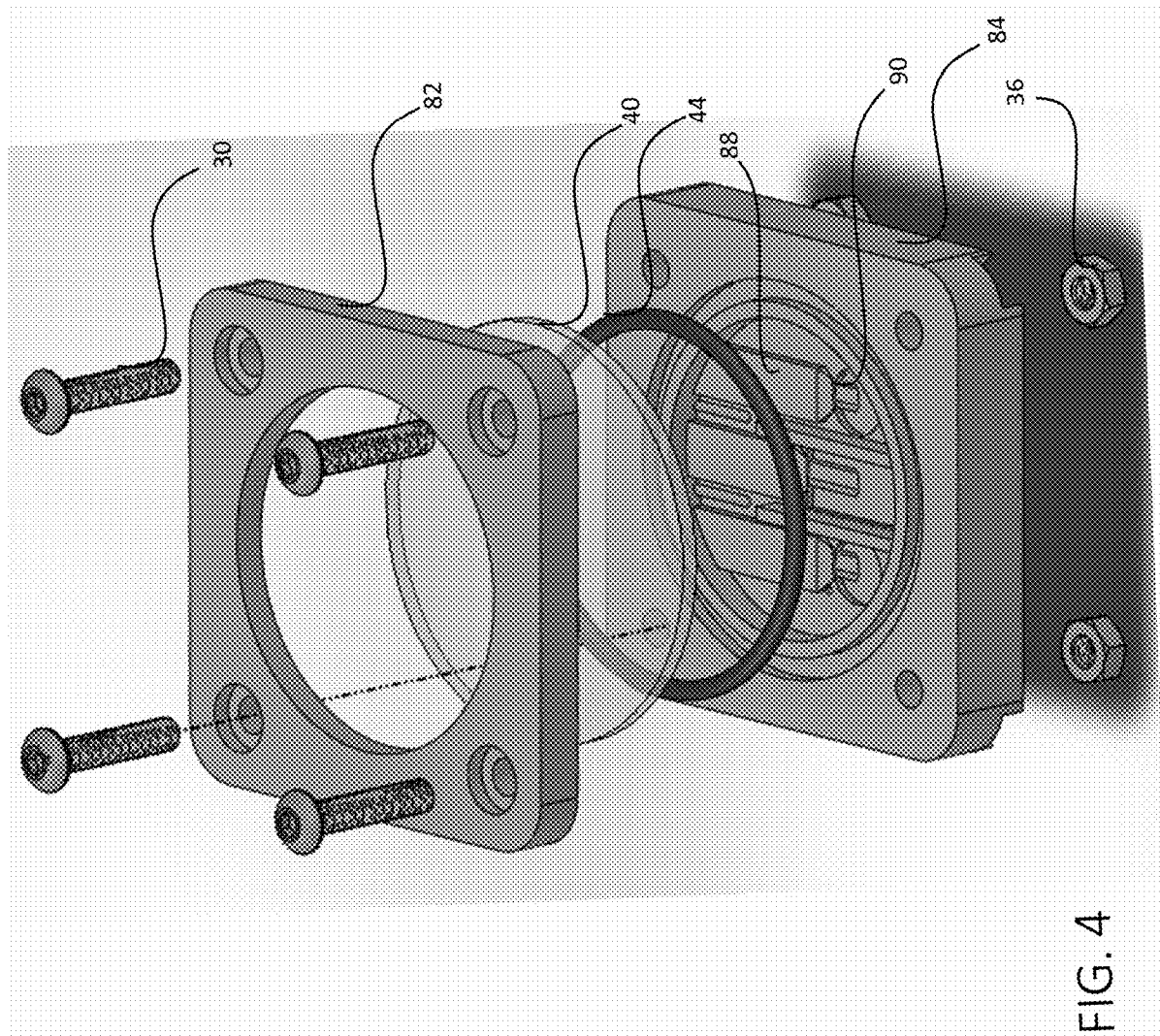
FIG. 4 is an exploded perspective view of the example test cell of FIG. 3.

FIGS. 3-4 show a test cell 80 according to another embodiment, which is generally similar to the test cell 20 in FIGS. 1-2. However, in the test cell 80, a cell top 82 and a lower base portion 84 of the housing both are generally square in planar configuration. Additionally, the lower base portion 84 has a smaller depth within an inner chamber 86 defined therein. The test cell 80 can be made thinner than the test cell 20, as a nonlimiting example, 14 mm or less in thickness, providing a lower profile test setup.

Disposed within the inner chamber 86 is a multi-electrode and/or sample holder (electrode/sample holder) 88, which may be configured (e.g., 3D printed, machined, or otherwise constructed or fabricated) for insertion into, integrated into, or otherwise accommodated within the inner chamber 86, e.g., directly or indirectly onto the lower base portion 84. The multi-electrode holder 88 may be produced separately from or into inner chamber 86, integrated into, or otherwise formed and placed into the inner chamber, for holding one or more electrodes within.

Figure 12:
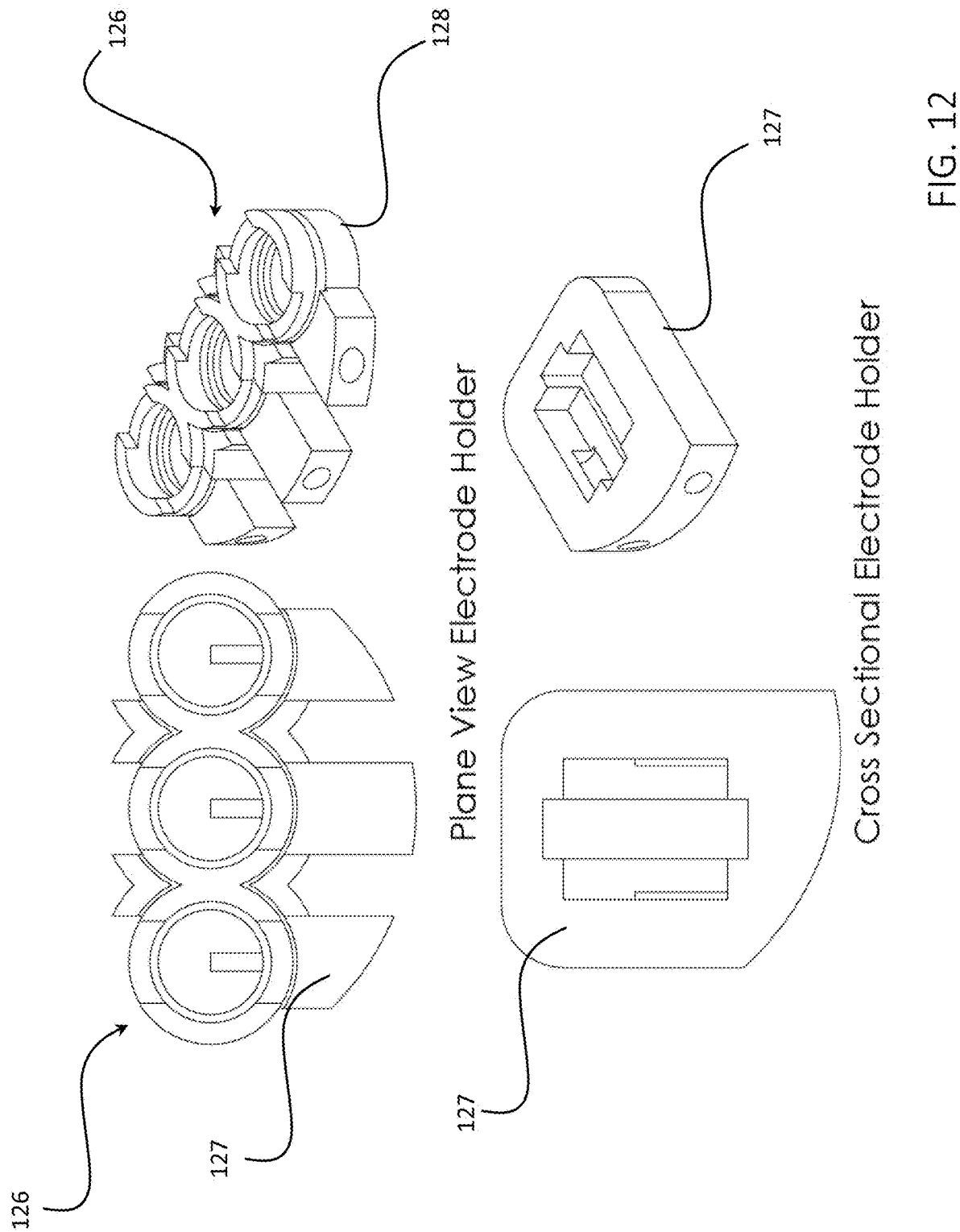
FIG. 12 shows plan and cross-sectional views of example insertable modular electrode/sample holders.
Figure 15:
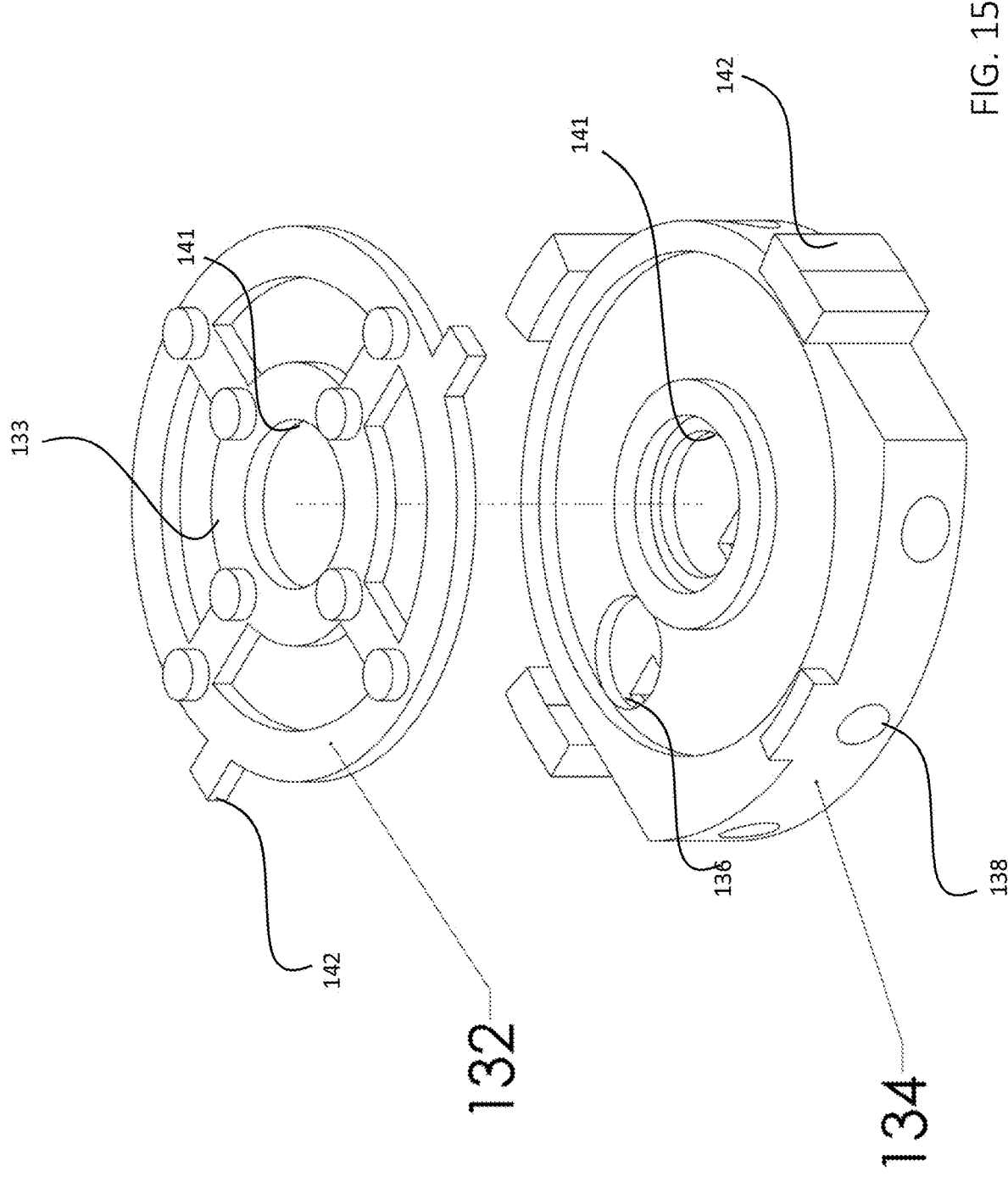
FIG. 15 shows an exploded perspective views of the modular insertable electrode/sample holder of FIG. 13.

The electrode/sample holder 88 shown in FIGS. 3-4 accommodates three electrodes and/or wire conductors (as a nonlimiting example), such as by including an opening area 90 for receiving each electrode and/or wire conductor. The outer opening areas 90 each extend into electrode holders (e.g., disk electrode holders) 92, which are circular in this example but may be other shapes. The inner (central) opening area extends into a generally rectangular sample holder 94 (the samples may also provide electrodes depending on the analysis performed). It will be appreciated that depending on the analysis that is to be performed, samples, wire conductors, and/or disk electrodes, in any combination, may provide one or more electrodes for the analysis. Example electrode/sample holders are shown in FIGS. 12 and 14-15. Other shapes for the electrode holders 92, sample holders 94 and/or opening areas 90 for electrodes and/or wire conductors may be used.

Figure 5:
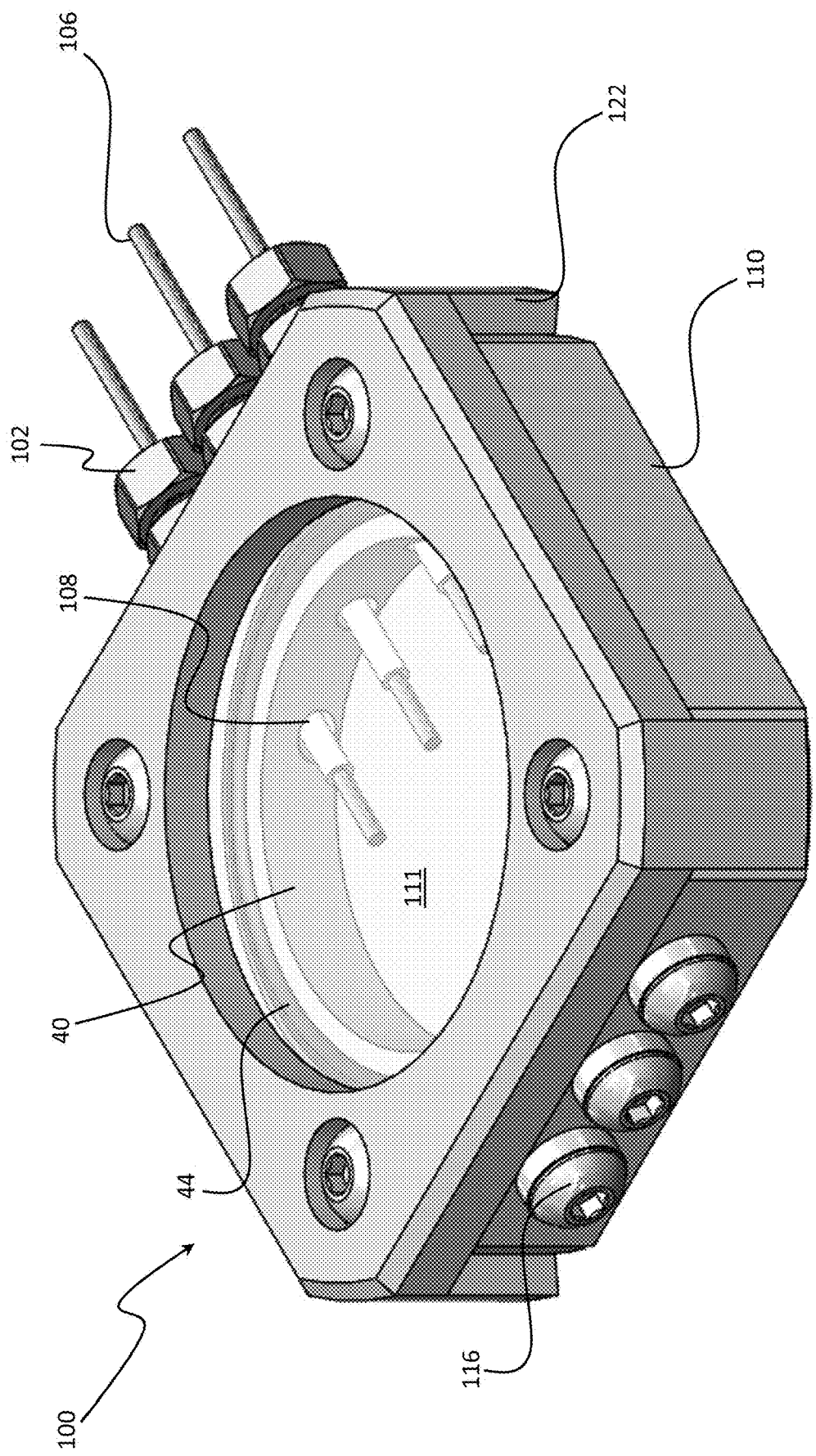
FIG. 5 is a top front perspective view of an example polyether ether ketone (PEEK) test cell with copper wires according to a third embodiment.
Figure 6:
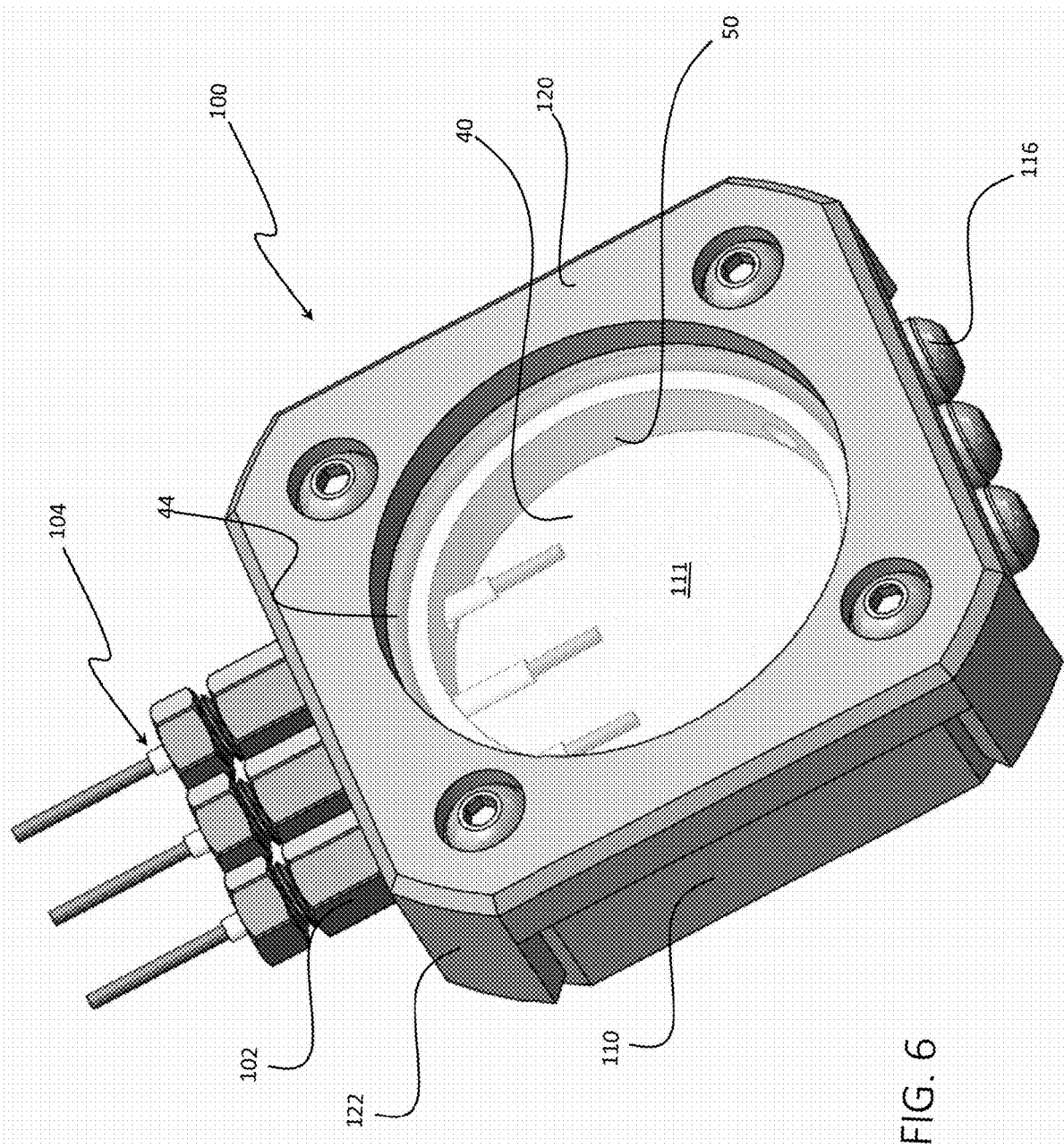
FIG. 6 is a top side perspective view of the example PEEK test cell with copper wires of FIG. 5.
Figure 7:
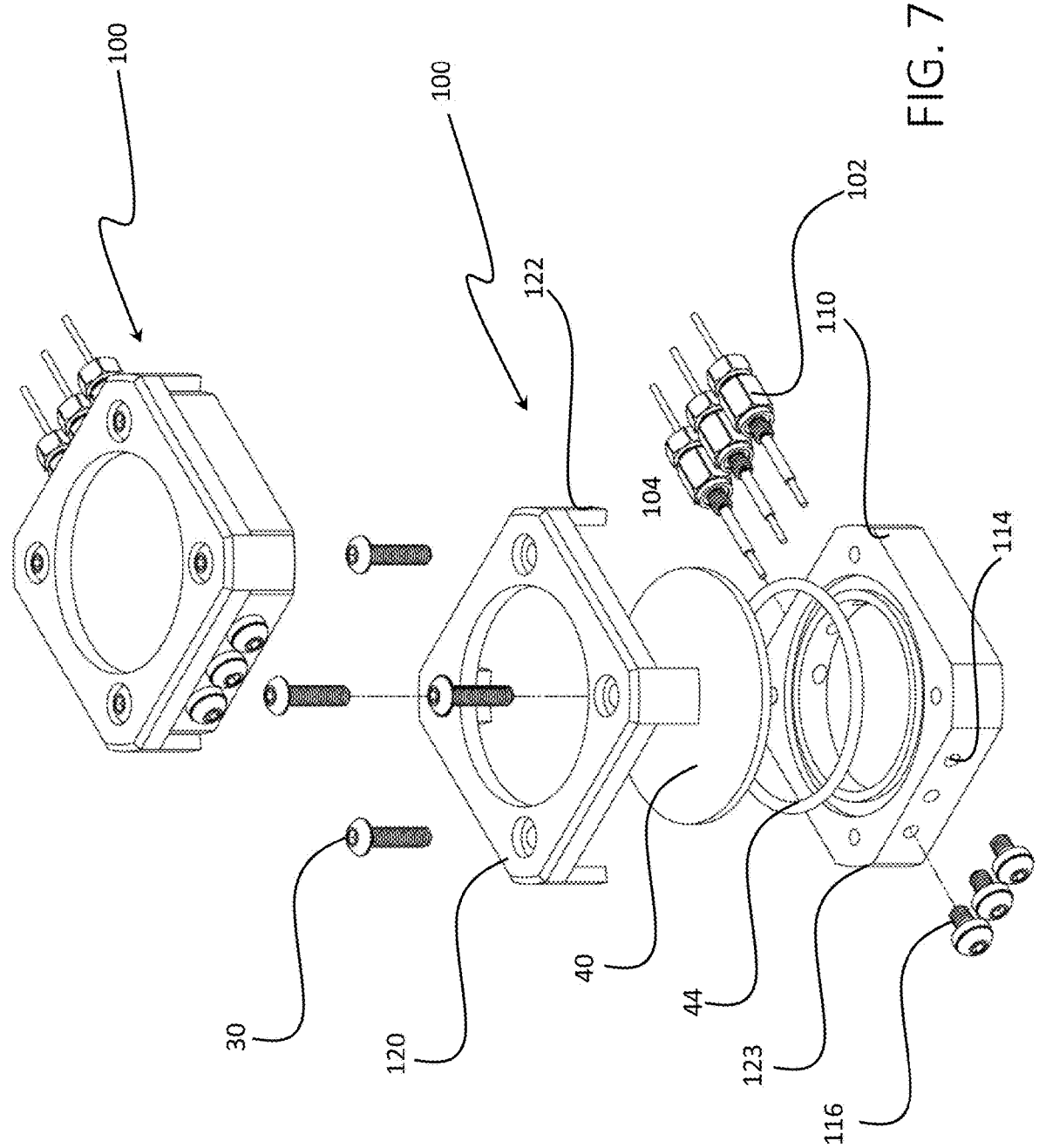
FIG. 7 is an exploded perspective view of the example PEEK test cell with copper wires.
Figure 8:
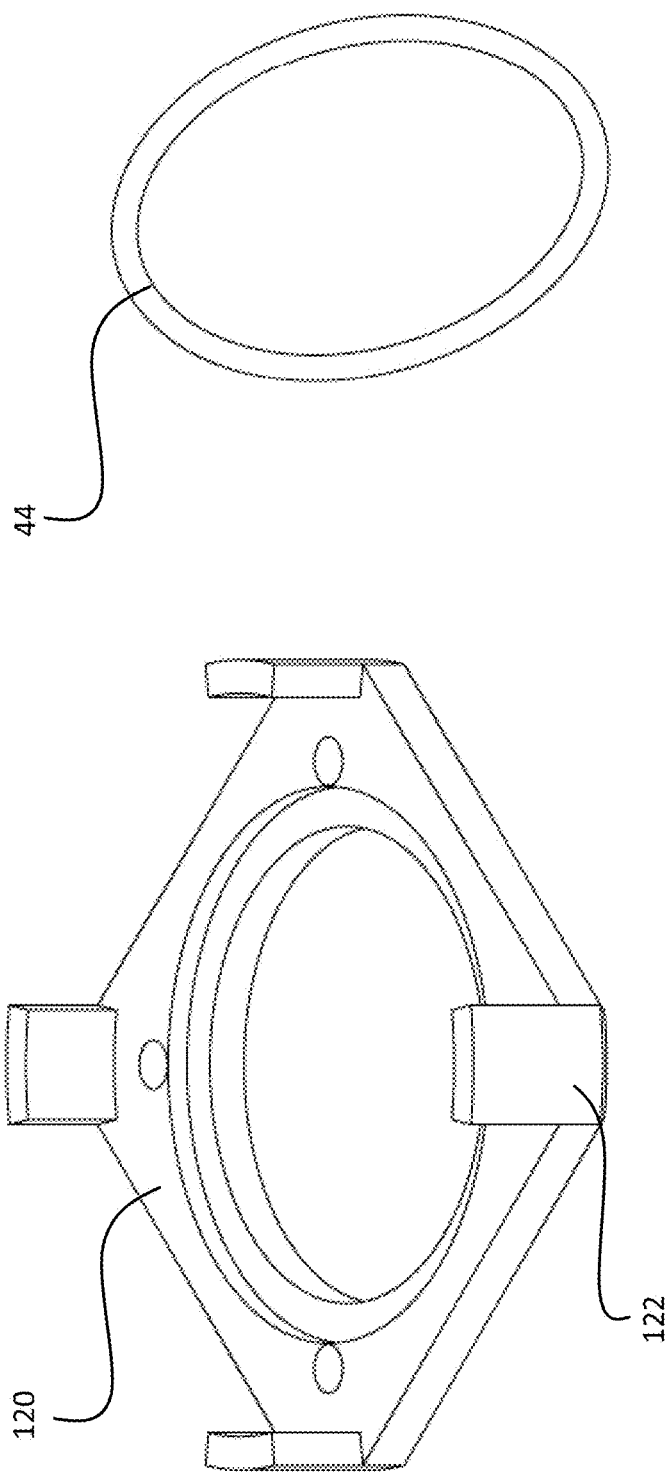
FIG. 8 shows perspective views of an example test cell top and O-ring of the example test cell shown in FIGS. 5-7.

Electrodes and/or wire conductors (not shown in FIGS. 3-4), such as but not limited to wire conductor 104 (which may provide an electrode) shown in FIGS. 5-6 below, may be disposed (e.g., inserted) within the electrode/sample holder 88 in the assembled test cell 80. One or more electrodes and/or wire conductors may extend through one or more ports (individual (one-to-one) and/or common ports) (not shown in FIGS. 3-4). It is not required for all the electrode holders to be used.

In some embodiments the ports may extend from an opening in an inner wall 96 of the lower base portion 84 to an opening at an outer surface on a side surface of the lower base portion, as more clearly shown by example in FIGS. 5-6 below, to provide signal coupling between the inner chamber 86 and external measurement instruments. Because the electrodes and/or wire conductors (e.g., 104) in test cell 80 extend from the side of the test cell (e.g., from the side of the housing assembly), the test cell can be thinner.

FIGS. 5-9 show a test cell 100 according to another embodiment, which is generally similar to the test cell 80 in FIGS. 3-4. In FIGS. 5-9 an electrode/sample holder such as the electrode/sample holder 88 is not shown, but it may optionally be provided, either by being integrated into the housing assembly, or in example embodiments is embodied in a modular electrode/sample holder that is inserted into the housing assembly, as disclosed in more detail herein.

Figure 10:
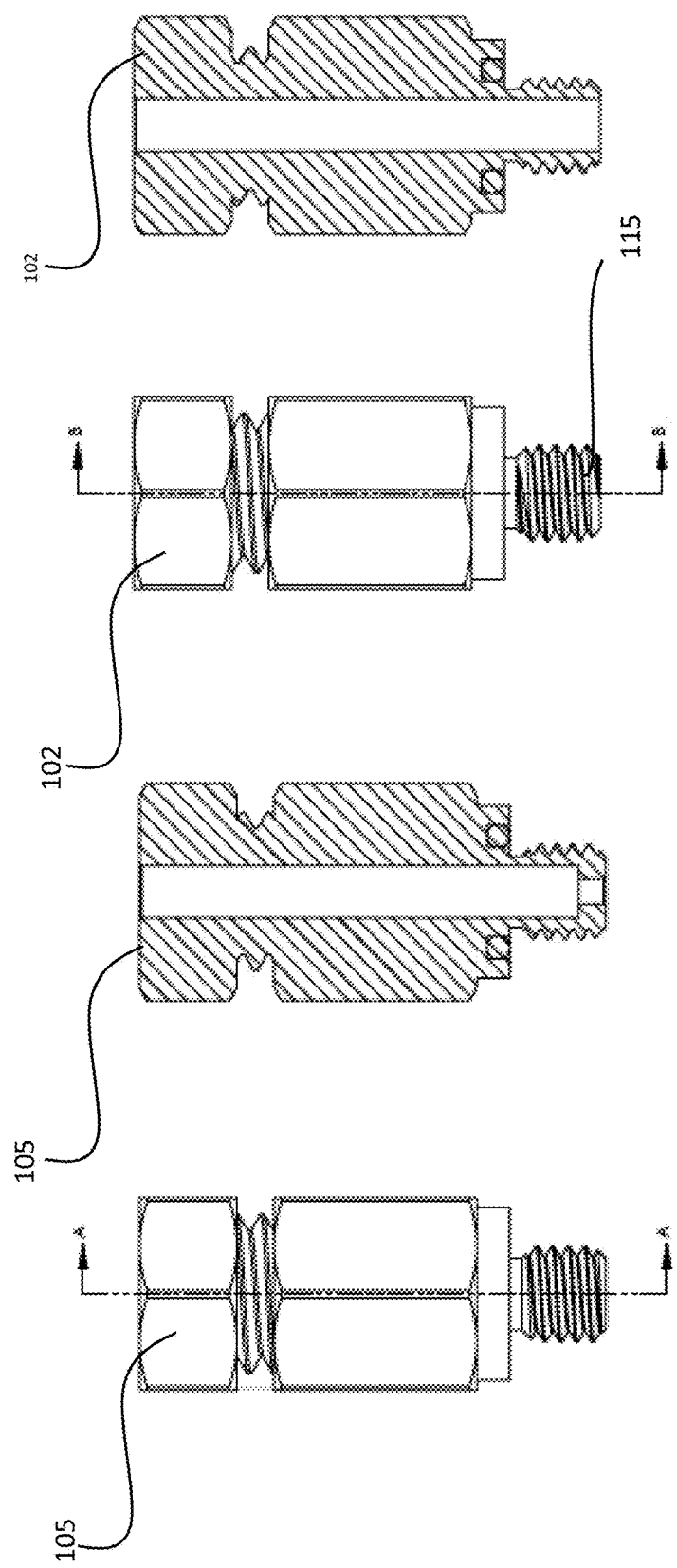
FIG. 10 shows views of an example compression fitting (right)) that may be used in the example test cell shown in FIGS. 5-7 and a pre-modification fitting (left)
Figure 11:
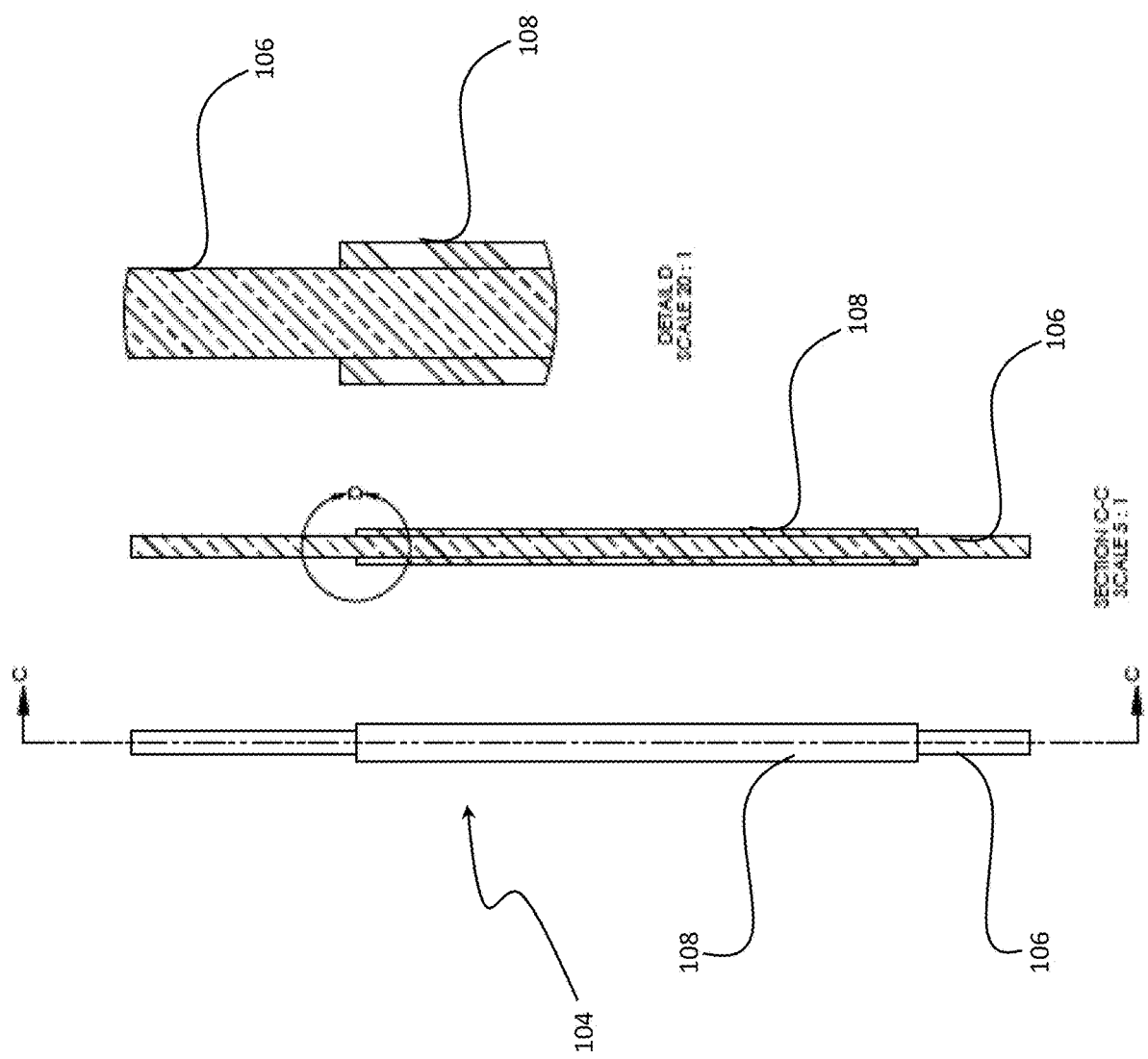
FIG. 11 shows views of an example electrode wire.

The test cell 100 includes compression fittings 102, which are preferably made of stainless steel, e.g., 316 stainless steel, or other suitable metal, for receiving electrodes (e.g., leads) 104. Particular example compression fittings 102 are shown, e.g., in FIG. 10, and example electrodes 104 are shown in FIG. 11.

The example compression fittings 102 are provided in a nonlimiting example by adapting (e.g., modifying) a 316 stainless steel fitting 105 provided by Beswick Engineering (P/N: M3CB-1016-316-V). The example compression fittings 102 can be reliably sealed when not in use, e.g., using common fasteners, a particular example being provided by McMaster-Carr (P/N 93627 A412).

The example electrodes and/or wire conductors 104 include sheaths 106 surrounding wire 108 (e.g., copper or other suitable conductive material). Using material such as PEEK for the sheaths 106 allows the electrodes and/or wire conductors 104 to remain electrically isolated from the rest of the test cell 100. It also reduces the available area for wires to potentially react. The electrodes and/or wire conductors 104 can be configured for suitability with various materials and/or applications.

In an example assembly, the electrodes and/or wire conductors 104 can be inserted (e.g., pushed) through an electrode/sample holder such as integrated electrode/sample holder 88, or through one or more modular electrode/sample holders, including, as nonlimiting examples, the modular electrode/sample holders shown in FIGS. 12-14 and described in more detail below.

As further shown in FIGS. 5-9, a lower base portion 110 of a housing assembly of the test cell 100 includes one or more ports, e.g., passageways, holes, throughholes, etc. for connecting an inner chamber 111 within the test cell with external devices. The example lower base portion 110 includes three ports, e.g., electrode and/or wire conductor ports 112, disposed (e.g., aligned) for receiving one or more electrodes 104 and three ports, e.g., fluid ports 114, disposed (e.g., aligned) for receiving fluid or other materials from a source external to the inner chamber 111.

The number of ports provided may vary as needed. Additional ports may be provided to increase adaptability of the test cell 100 for various types of analysis, and unused ports may be sealed when not in use.

Fluids entering via fluid ports 114 can be of any type, material, state, etc. Materials for any components provided herein may be selected and configured to accommodate various fluid or other external material types, including materials resulting from reactions. The compression fittings 102 may include couplings such as outer threads 115 to engage with inner threads (FIG. 19) of the electrode and/or wire conductor ports 112 to secure the compression fittings and improve sealing. Additional seals (e.g., o-rings) 190 (FIG. 19) may be provided between the compression fittings 102 and the outer surface of the lower base portion 110 or an inner surface of the electrode and/or wire conductor ports 112.

It will be appreciated that any of the ports 112, 114 could be used for accommodating electrodes, wire conductors, fluid, or other externally provided material, in any number, arrangement, and/or combination, furthering the example modular designs. Although the inner chamber 50, 111 and arrangement of ports shown in example embodiments is generally circular for symmetry (and/or to provide various flow type designs), other shapes/arrangements/configurations are possible.

The fluid ports 114 can be sealed by suitable fasteners such as fasteners 116 and/or in communication with sealed fluid passages (e.g., tubes or channels). Fasteners 116 may themselves include interior ports for fluid flow if desired. Additional seals (e.g., o-rings) 191 (FIG. 19) may be provided between the fasteners 116 and an outer surface of the lower base portion 110 or at an inner surface of the fluid ports 114.

Referring again to FIGS. 5-8, a cell top 120 of the test cell 100 defines a greater planar area than that of the lower base portion 110. Legs 122 extending from the cell top 120 engage corners 123 of the lower base portion 110 to further secure assembly and alignment.

FIG. 12 shows an example modular electrode/sample holder 126, which includes a plurality of (as shown, three) electrode/wire conductor holder portions 127 and a plurality of (as shown, three) electrode/sample holder portions 128. Electrode/sample holders can be 3D printed, machined, or otherwise formed. Example materials for modular electrode/sample holders 126 include, but are not limited to, polypropylene or PEEK plastic (for corrosive environments); metal, including stainless steel or other metals, or other materials.

A large ratio of reaction volume to test cell volume in example modular electrode/sample holders 126 can allow for a variety of geometries, test configurations, analysis techniques, etc. to be conducted in a single test cell 100. By providing separate, modular sample holders for selection and insertion within the inner chamber 111 of the test cells 100, various tests can be conducted using example test cells by changing the holders.

Figure 13:
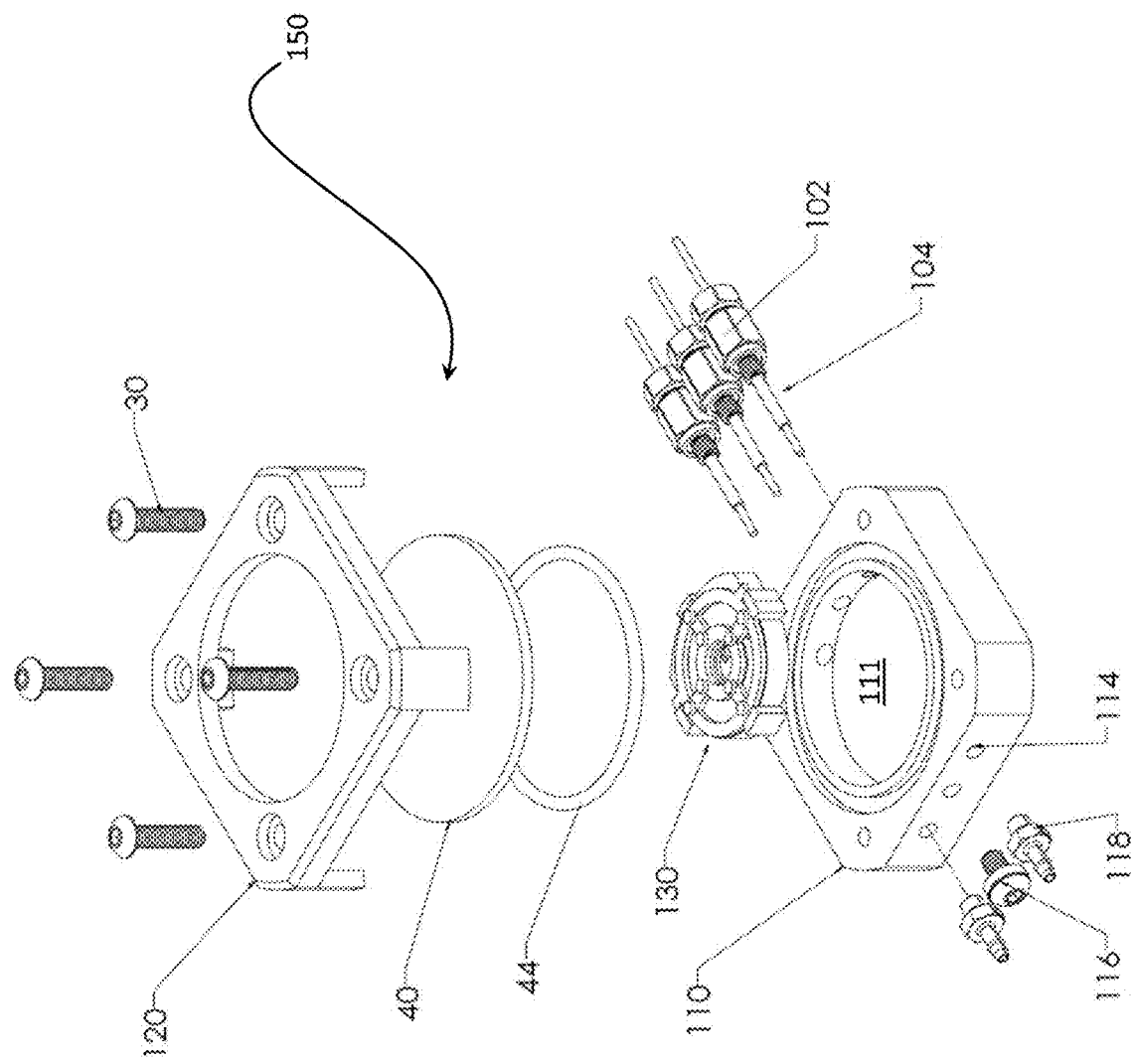
FIG. 13 is an exploded perspective view of an example test cell including a modular insertable electrode/sample holder according to a fourth embodiment.

Another example test cell 150, shown in FIGS. 13-15, includes a housing assembly, e.g., including cell top 120 and cell lower base 110, that is generally similar to the test cell 100. In test cell 150, the outer two sealing screw assemblies 116 are replaced with hose barb connectors 118 for introduction of external materials.

A multi-piece modular electrode/sample holder 130 for insertion into the inner chamber 111 of the test cell 150 (or other example test cells disclosed herein) includes a top portion 132 having a surface 133 to help create electrical contact between the sample (not shown) and an electrode disk (not shown) which can be placed in holder 136. In the (non-limiting) example of electrochemistry, the outer ring of lower portion 134 can contain, for instance, a counter electrode and the inner circle can contain, for instance, a working electrode. A lower portion 134 engages (e.g., mates) with the top portion 132, ports 138 for accommodating the electrodes and/or wire conductors, and ports 140 for accommodating external materials via the barb connectors 118. A central opening 141 extends through the top 132 and lower portions 134 of 130 for visualization of reactions. The top portion 132 and lower portion 134 may include aligning members 142 for aligning the top/bottom portions. The multi-piece modular electrode/sample holder 130 can be made from, as nonlimiting examples, polypropylene, PEEK, nylon, or other inert (for instance) materials. PTFE is another example material that may be useful for studying some samples.

The test cell 150 enables further analysis methods that will be apparent to someone skilled in the art having reference to the disclosure herein. These include, but are not limited to, gas chromatography, mass spectrometry, as well as microfluidic and biological analysis.

Other example embodiments may include additional features to accommodate or optimize various testing methods. For example, a stir bar (not shown) may be disposed into the inner chamber for improved mass transport and aided electrochemical analysis.

The electrode/sample holders 88, 126, 130, compression fittings 102, electrode and/or wire conductor and fluid ports 112, 114, fasteners 116, connectors 118, etc. provide a modular system for accommodating various types and amounts of testing devices (and connected) instrumentation in operando testing systems. This allows signal, electrical, and/or fluid (or other material) connections between the inside and the outside of the test cells, while still providing a hermetic seal within the inner chamber 50, 111 and avoiding leaks present in some conventional test cells. The compression fittings 102, single electrode/sample holders, multi-electrode/sample holders, and other features may be configured (e.g., printed or otherwise fabricated) and provided in any desired combination to support various testing methods. The example electrode and/or wire conductor holders can be configured and arranged to avoid interference between the embedded electrodes and/or wire conductors.

The modular nature of example test cells allows operando assessment of chemical and/or electrochemical reactions using various selected types of instrumentation. Additionally, providing a large window 40, though not required in all embodiments, makes it easier to observe phenomena as needed or desired.

In example operando testing systems, the test cell 20, 100, 150 may be disposed under a Raman spectroscopy system. In such systems, the window 40 may be made from quartz or a similar material.

Figure 16:
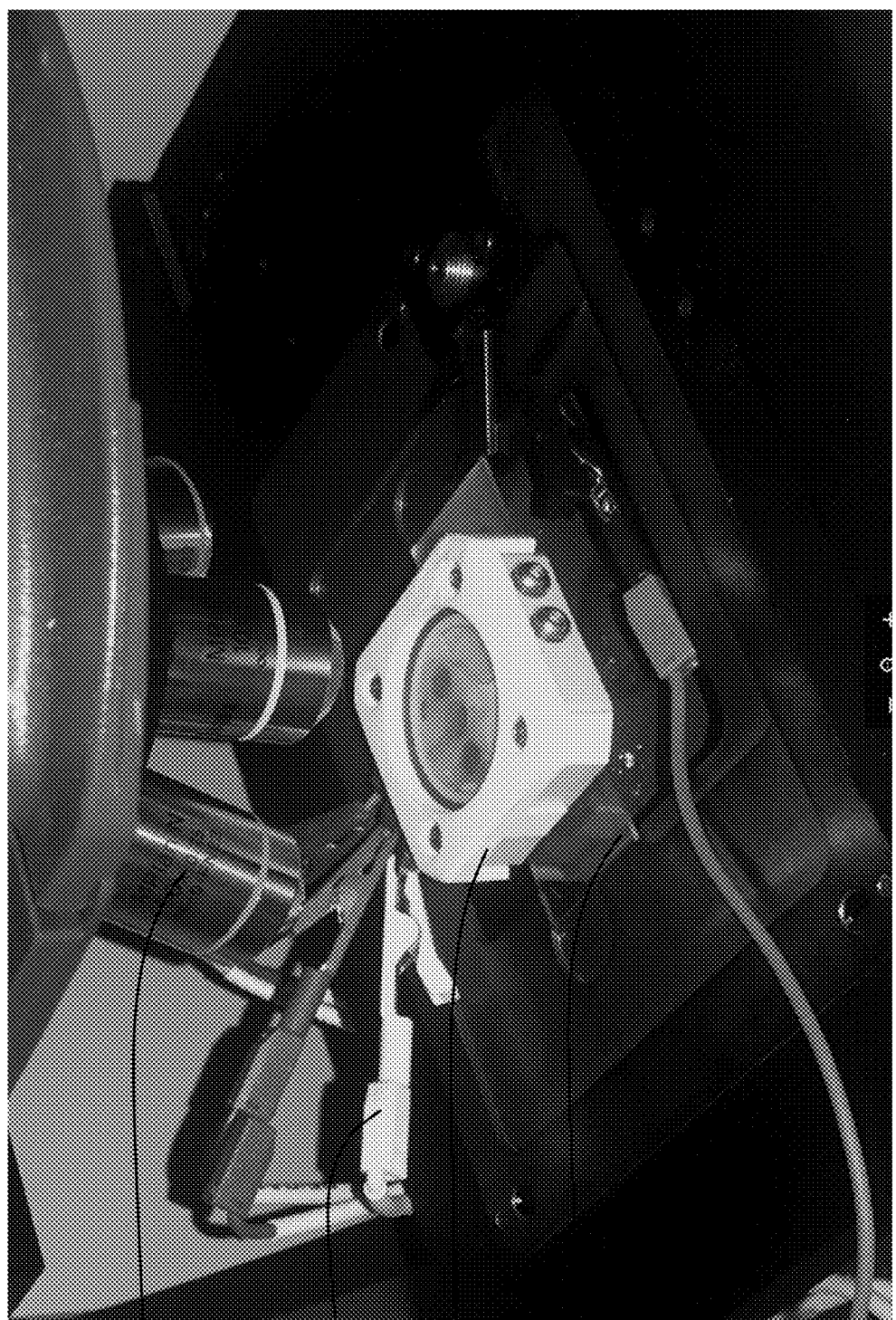
FIG. 16 illustrates an example operando testing system including a test cell being used for in situ Raman Spectroscopy and Electrochemical Testing.

FIG. 16 shows an example operando testing system 200 including test cell 150. The test cell 150 is disposed under a scope 202, e.g., placed on a stage 204. An example scope 202 is a Raman spectroscopy system. Electrodes 206 extending from the test cell 150 can be coupled to analysis instruments (not shown), which in turn may be coupled to or otherwise in communication with a computer or other processor for further analysis.

An example operation of the operando testing system 200 includes the continuous collection of Raman spectra (either 1D or 2D) while a chemical or electrochemical reaction is occurring. In a non-limiting example, a Linear Sweep of working electrode voltage is performed while the simultaneous collection of Raman spectra are acquired. Together these sets of data provide correlated insight into how an electrochemical response effects the chemical composition of the sample surface.

Figure 17:
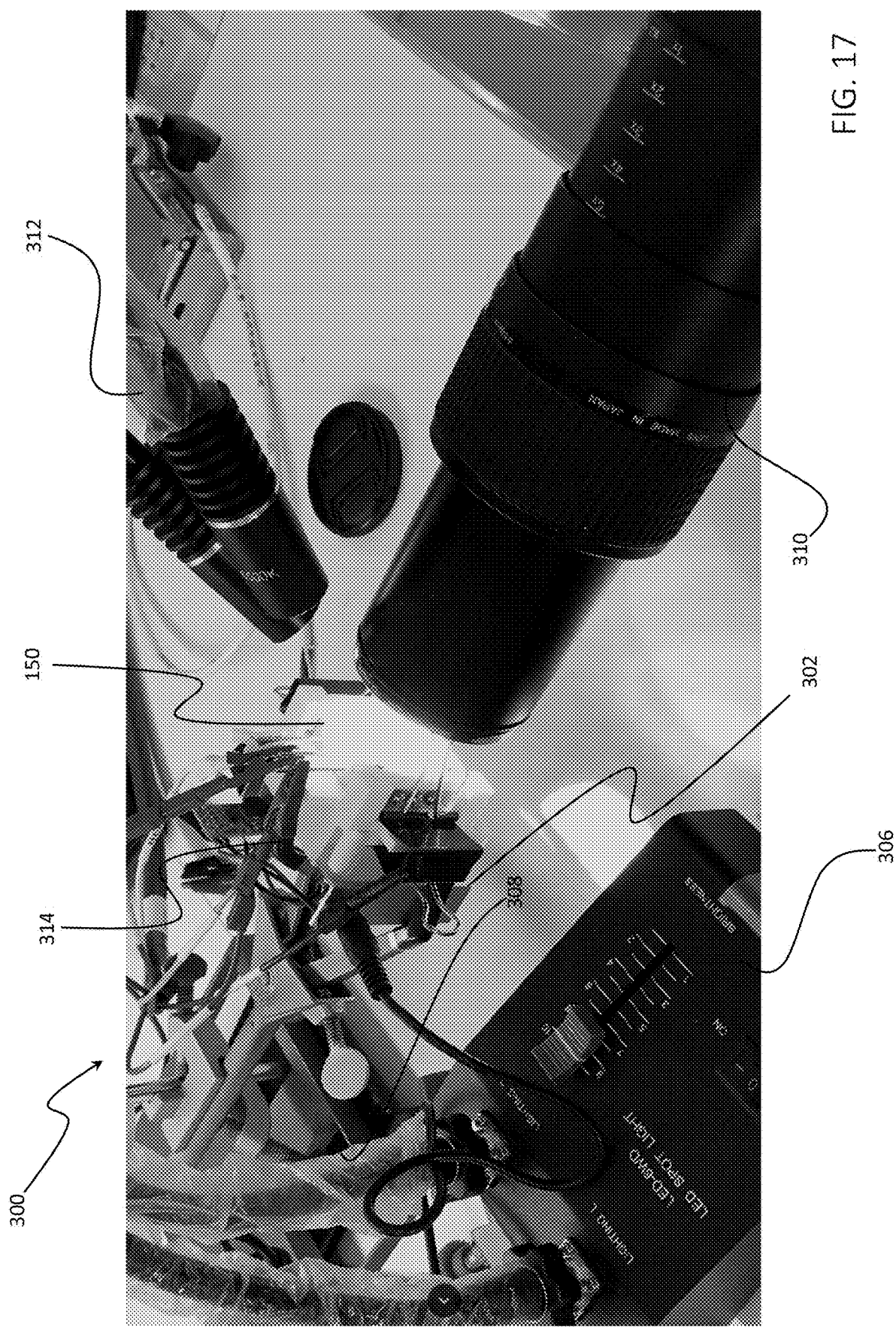
FIG. 17 illustrates an example operando testing system including a test cell being used for operando Optical Microscopy and Electrochemical Testing.

FIG. 17 shows another example operando testing system 300 including test cell 150 that is supported on a selectively positionable test stage 302. A light, e.g., an LED light, is introduced to the test cell 150 from a light source 306 via a light guide or path 308. A camera 310, such as a high resolution (e.g., 2K, 4K or higher) camera, and in a particular embodiment a digital camera, is positioned to observe behavior within the inner chamber. A scope 312, such as but not limited to a 4K video capture of reaction evolution.

In an example operation of the operando testing system 300, a high resolution 4K video capture microscope is set up to collect morphological optical data on the dynamic evolution of the sample surface during electrochemical operation. The cell design facilitates high quality data capture such that the entire electrode surface can be monitored but still frames can also be cropped down, e.g., to have a resolution of <10 um, <50 um, <100 um, or <200 um. In a non-limiting example a positive constant current can be to the working electrode for 5 minutes (or any length of time, e.g., on the order of seconds to days) and a negative constant current can be applied for 5 minutes (or any length of time, e.g., on the order of seconds to days). This cycle can repeat for as long as necessary.

The test cell 150 and/or the camera can be positioned on the test stage 302 to selectively provide one or more viewing positions for the camera 310 and/or microscope 312, to provide improved functionality. Electrodes and/or wire conductors 314 extending from the test cell 150 are coupled to measuring and/or analysis instruments (not shown, which in turn may be coupled to or otherwise in communication with a computer (not shown) for further analysis. The data provided by the camera 310, microscope 312, and/or the coupled analysis instruments can be processed for operando analysis.

Figure 18:
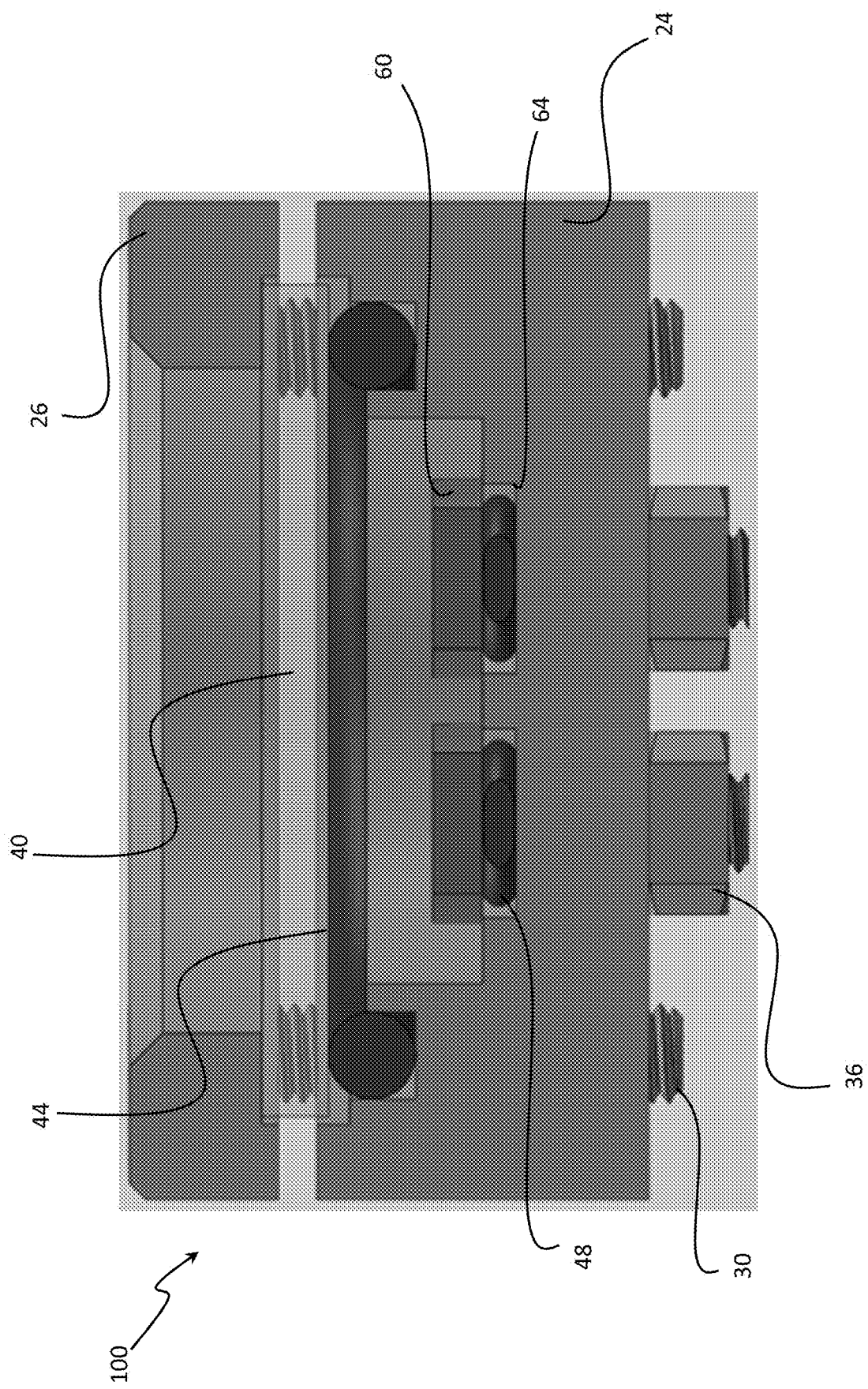
FIG. 18 is a sectional view of a test cell similar to the test cell of FIGS. 1-2, showing an example electrical connection arrangement.

FIG. 18 shows an example electrical connection arrangement for test cell 20. The electrode holders 60 extend through a bottom surface of the lower base 24. The seats 64 accommodate the o-rings 48 to help seal the inner chamber 50.

Figure 19:
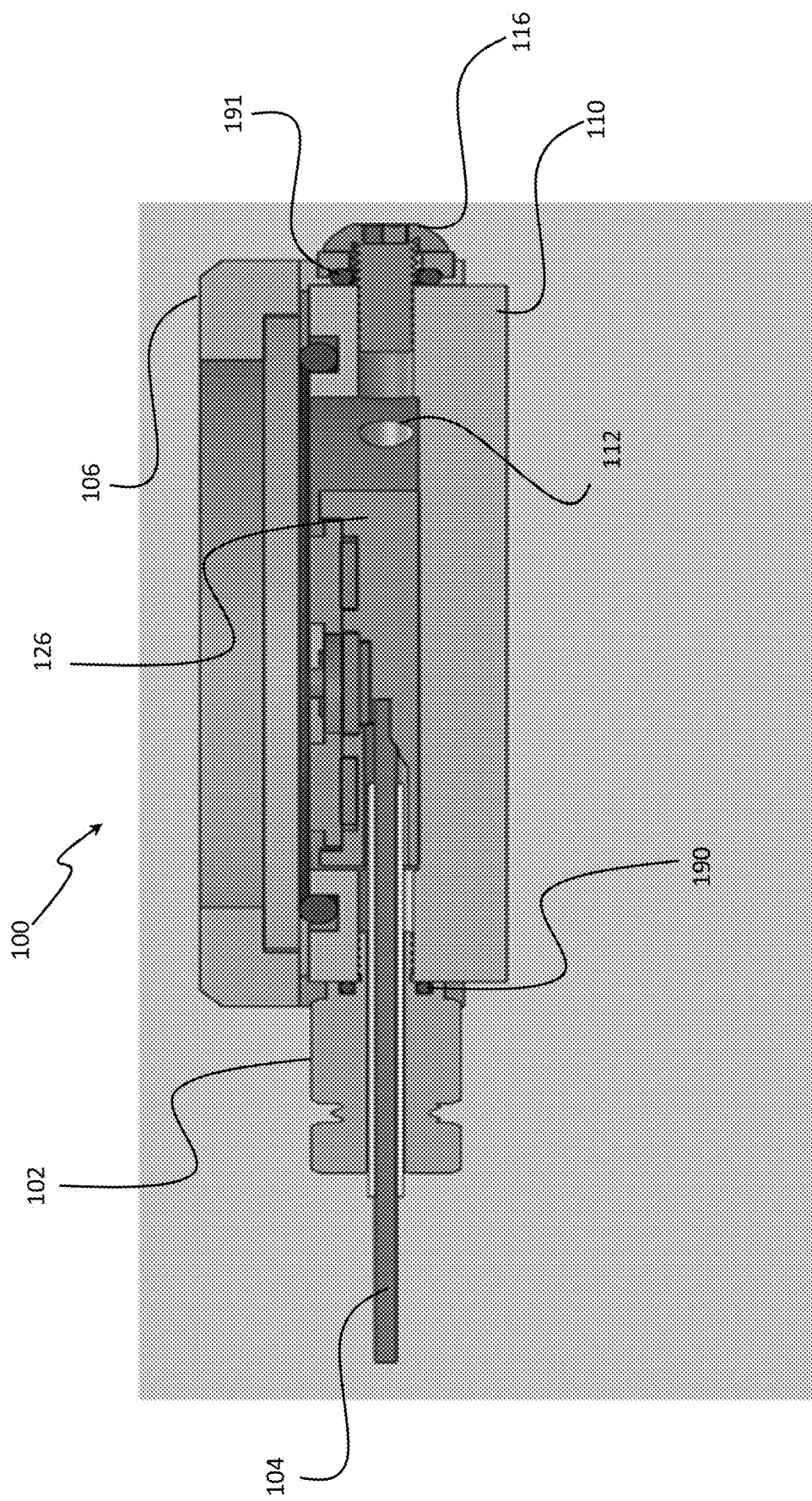
FIG. 19 is a sectional view of a test cell similar to the test cell of FIGS. 3-4, showing an example electrical connection arrangement.

FIG. 19 shows an example electrical connection arrangement, e.g., for test cell 150, which further includes modular electrode/sample holder 126. The electrodes 104 extend through the compression fittings 102, which are disposed along the side of the test cell 100, e.g., along the side of the lower base 110. Providing the electrical connections on the side of the test cell 100 allows the test cells to have an overall reduced thickness, and allows samples to be placed in optimal positions for accurate and clean data collection. For instance, test cell 100 may have a thickness less than about 14 mm, while test cells accommodating electrodes via a bottom of the housing assembly such as test cell 20 may have a thickness less than about 28 mm. Either example thickness will enable many analytical analysis techniques that may not be feasible with substantially thicker test cells. It will be appreciated that these thicknesses are merely examples. The additional ports, e.g., fluid ports 116, provided allow filling of external material, such as but not limited to electrolytes, for electrolyte filling and enhanced analysis options.

The modular electrode/sample holder 126 provided for test cell 100 is merely an example, and other modular electrode/sample holders can be configured for various testing configurations. Configurable, e.g., machinable or 3D printable, insert provide the possibility for many varied testing configurations, which in turn allows various analysis techniques to be used.

Figure 20:
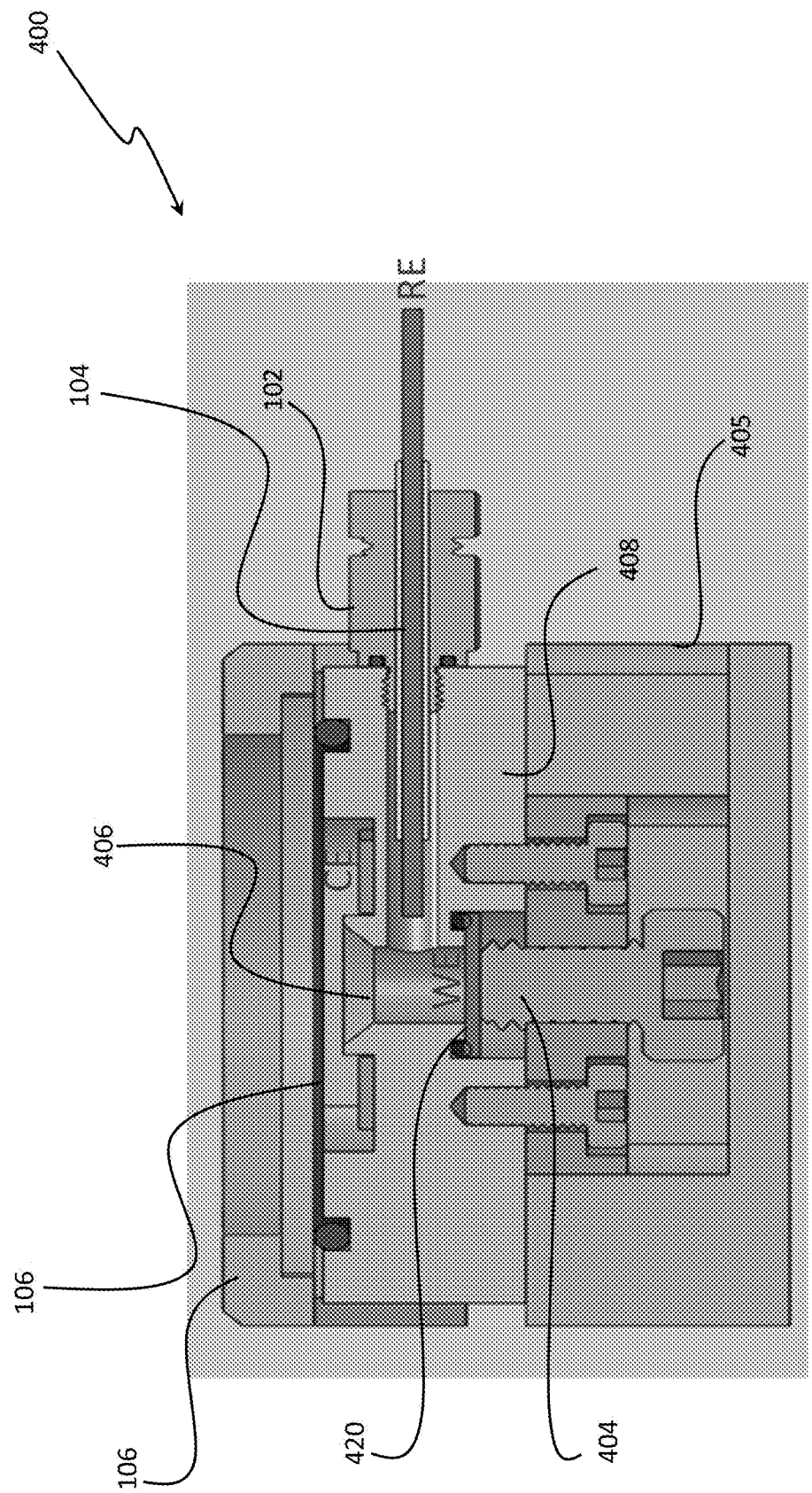
FIG. 20 is a sectional view of a test cell showing an alternative connection arrangement.

FIG. 20 shows another example electrical connection arrangement for a test cell 400. In test cell 400, electrical connections embodied in electrodes 104 are disposed through compression fittings 102, which are disposed on a side of the housing assembly. An electrical contact is provided, for instance, by a screw 404 that extends through a center of a lower base 405 to a bottom of a cylindrical viewing hole 406, where a reaction can take place with a sample (e.g., a piece of Lithium or other material) (not shown) that can be placed in contact with the electrical contact. The sample placed in indirect contact with the electrical contact (e.g., screw 404) provides a working electrode (WE). The cylindrical viewing hole 406 is located within an inner chamber 408, and allows a microscope or other viewing instrument to observe the surface of the electrode. A reference electrode (RE) provided by one or more of the electrode/wire conductors 104 can be arranged with respect to the working electrode such that the reference electrode is as close as possible to the working electrode (for instance, within <2 mm, <3 mm, <4 mm, or <5 mm) to minimize junction potentials for electrochemical measurements. Doing so helps make the generated data cleaner and more accurate. A counter electrode (CE) may be additionally provided within the inner chamber 408, for instance, for electrochemistry analysis.

In some applications and testing configurations, reactions between electrical connections and the reaction environment may interfere with data collections. To address this, a sealing mechanism 420 may be provided on the surface of working electrode 404 to environmentally isolate the working electrode, helping to prevent electrical contacts reactions. While this can increase test cell thickness relative to test cells 100, 150 (e.g., to less than about 28 mm as a nonlimiting example), this thickness is still sufficiently small to be used a wide range of analytical techniques. The sealing mechanism 320 can be embodied in, as nonlimiting examples, an o-ring or gasket made from materials such as, but not limited to, Kapton, Kalrez, Viton, Cu, stainless steel, and others.

Figure 21:
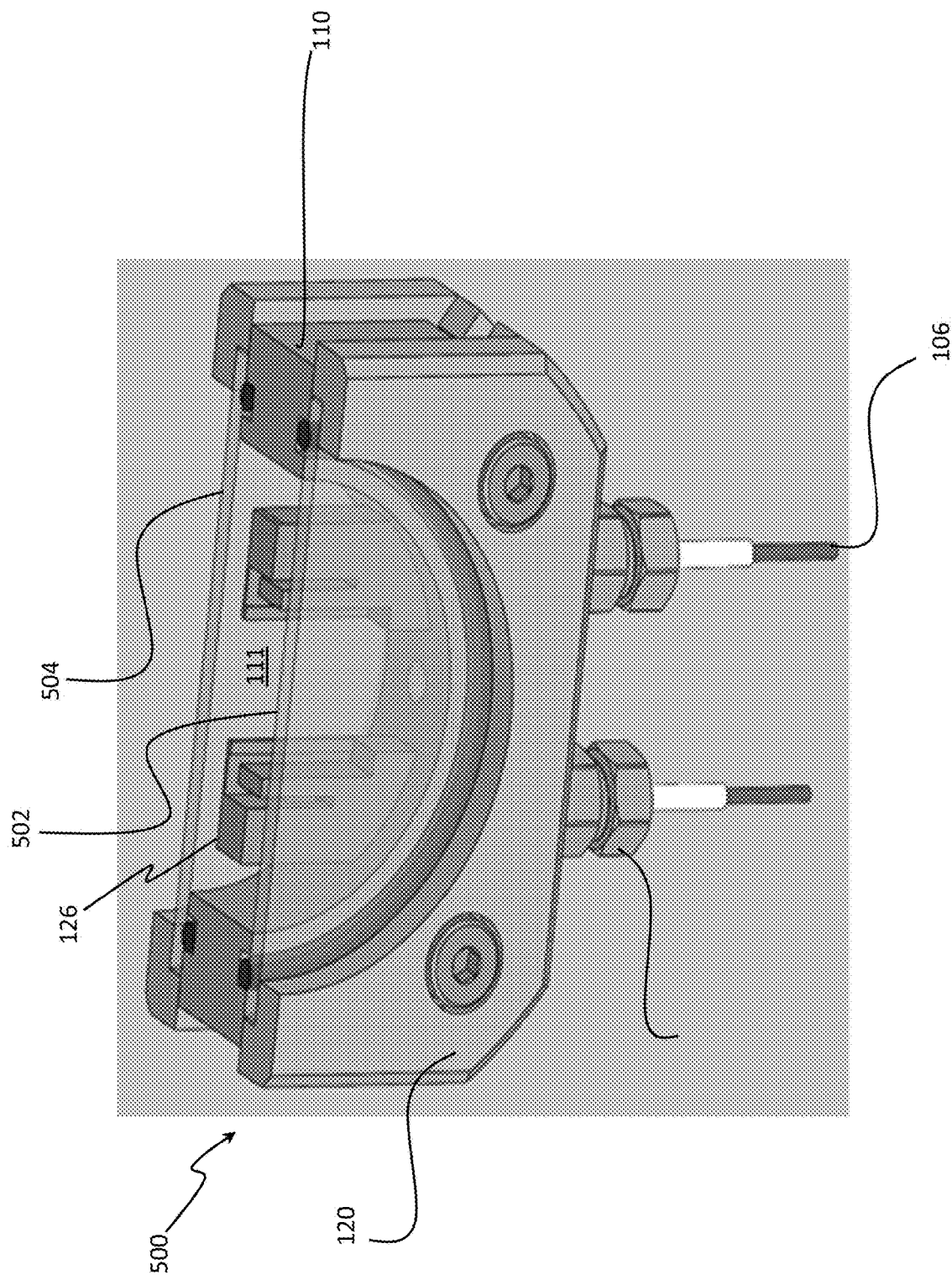
FIG. 21 is a partial perspective view of a test cell including top and bottom windows.

FIG. 21 shows another example test cell 500 similar to test cell 100, and having doubled sided windows 502, 504 enclosing the inner chamber 111. This example design allows for transmission experiments.

Figure 22:
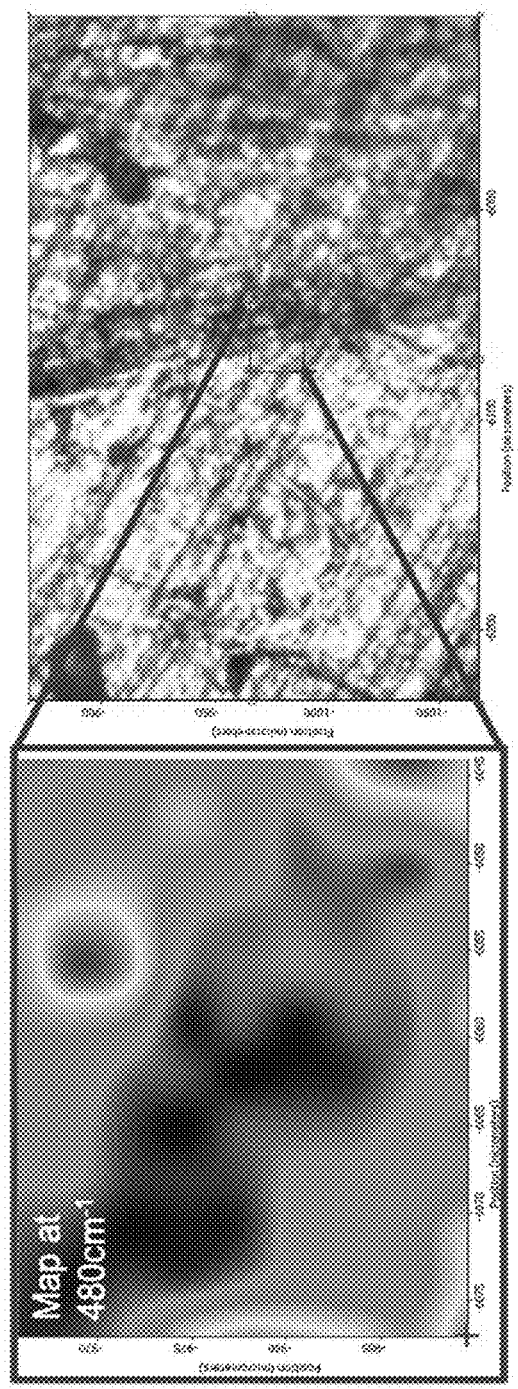
FIGS. 22-23 show example data collected using the electrical connection design shown in FIG. 19, where
Figure 23:
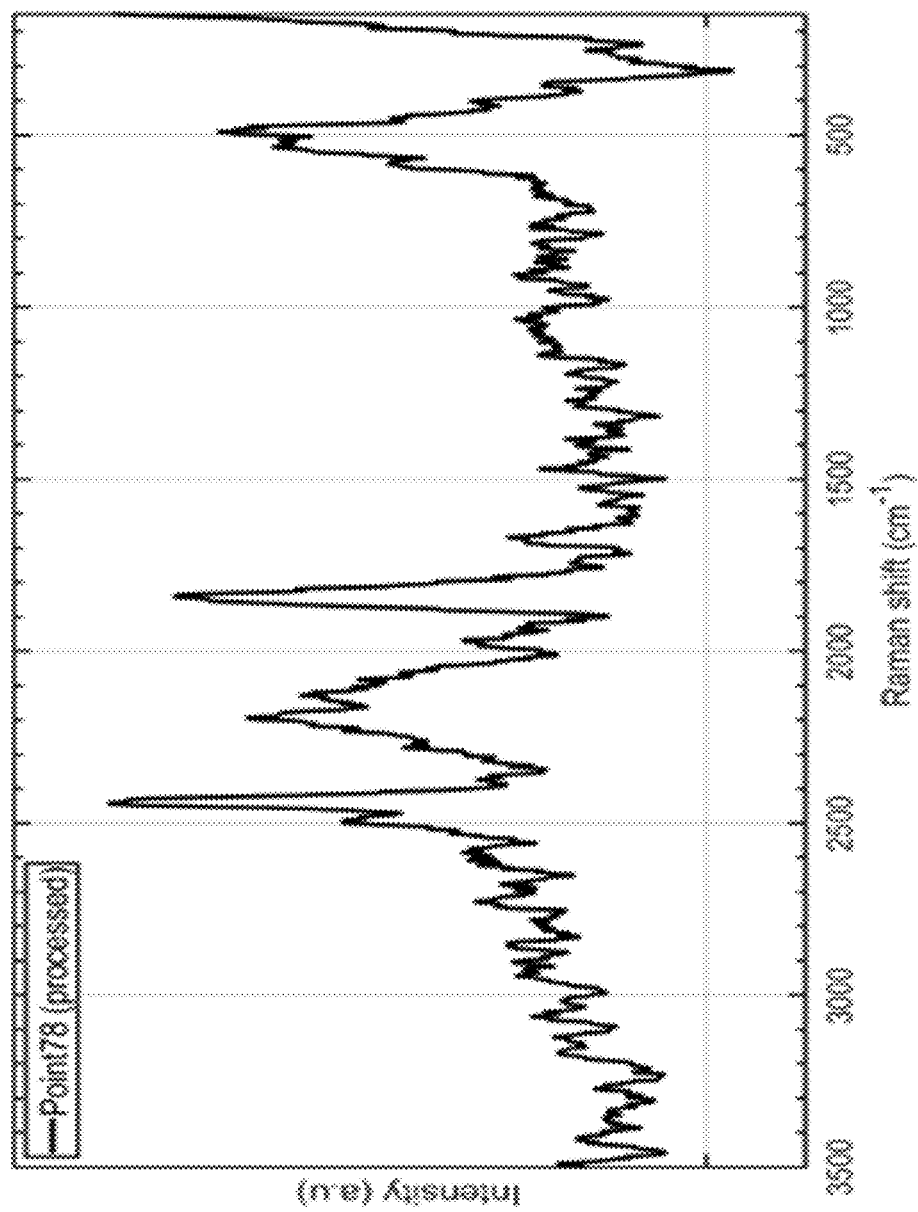
Figure 24:
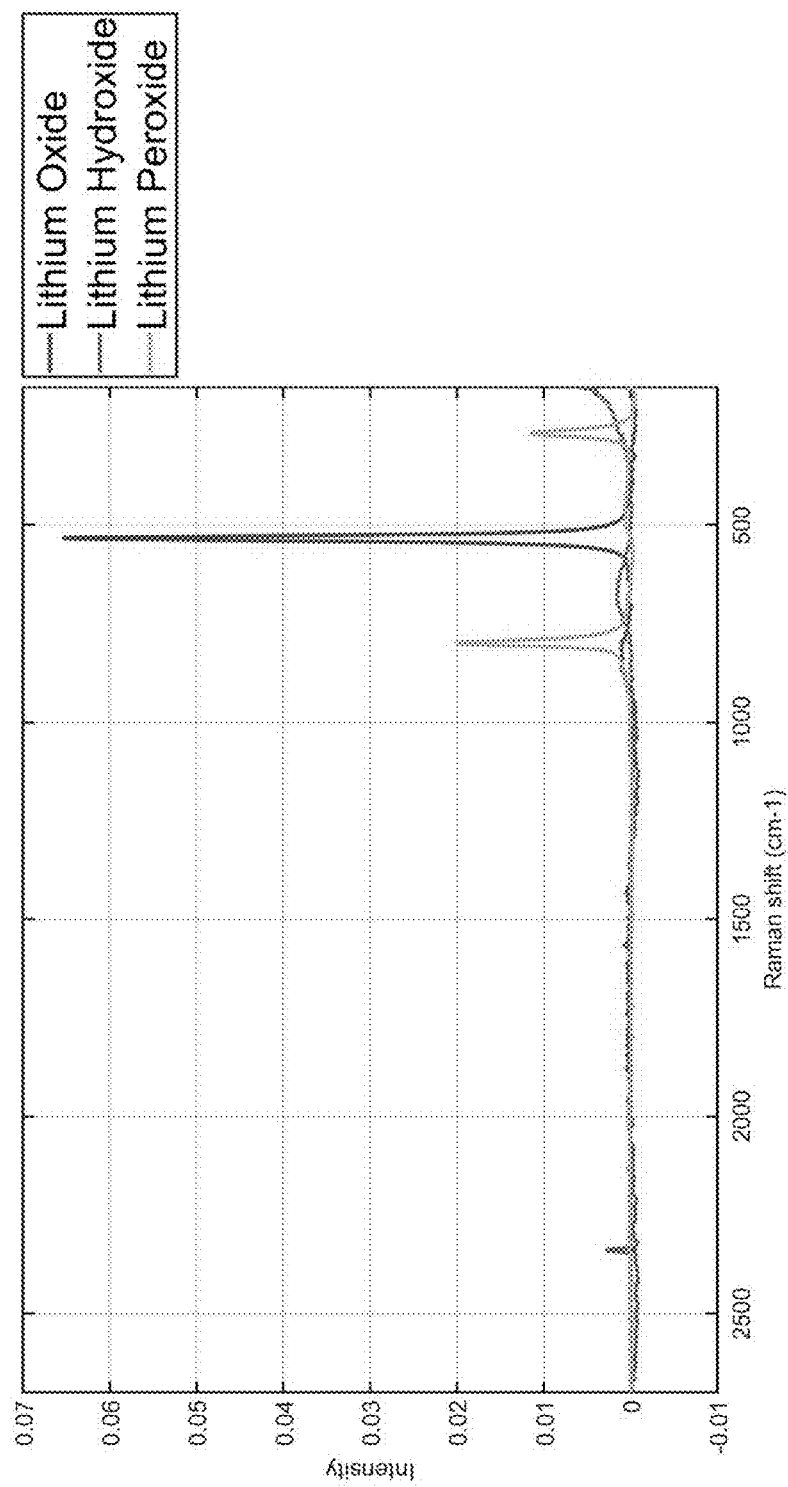
FIG. 24 shows example Raman data on baseline lithium (Li) reference samples (lithium oxide, lithium hydroxide, lithium peroxide).

FIGS. 22-23 show example data collected using a test cell such as test cell 150 having the electrical connection design shown in FIG. 19. FIG. 22 shows in-situ Raman mapping, while FIG. 23 shows example spectral data (Raman shift vs. intensity) collected using this example design. FIG. 24 shows example Raman data on baseline lithium (Li) reference samples (lithium oxide, lithium hydroxide, lithium peroxide). The example data shows clear spectra for Ramen analysis that is free from excessive noise and superimposed Raman peaks associated with the cell components.

Figure 25:
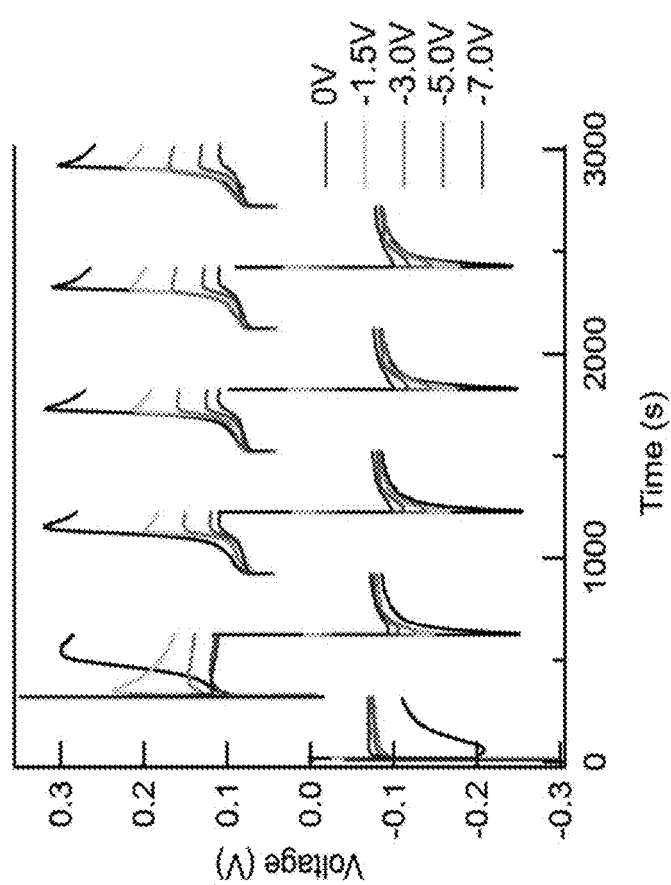
FIGS. 25-26 show example electrochemistry data collected the electrical connection design shown in FIG. 19, demonstrating reproducibility of measurements collecting using the cell.
Figure 26:
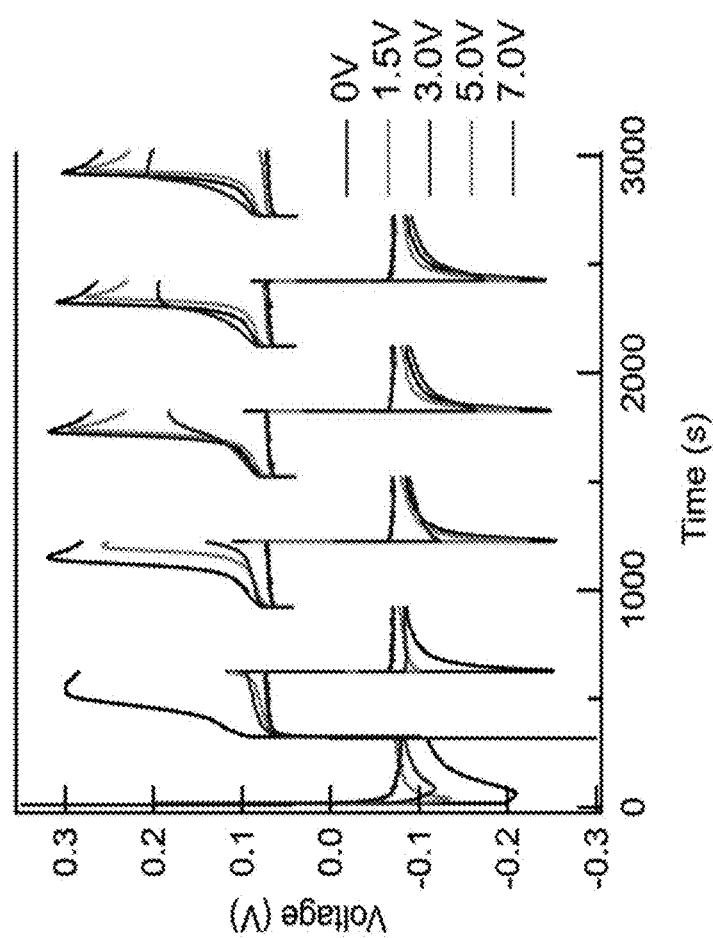
Figure 27:
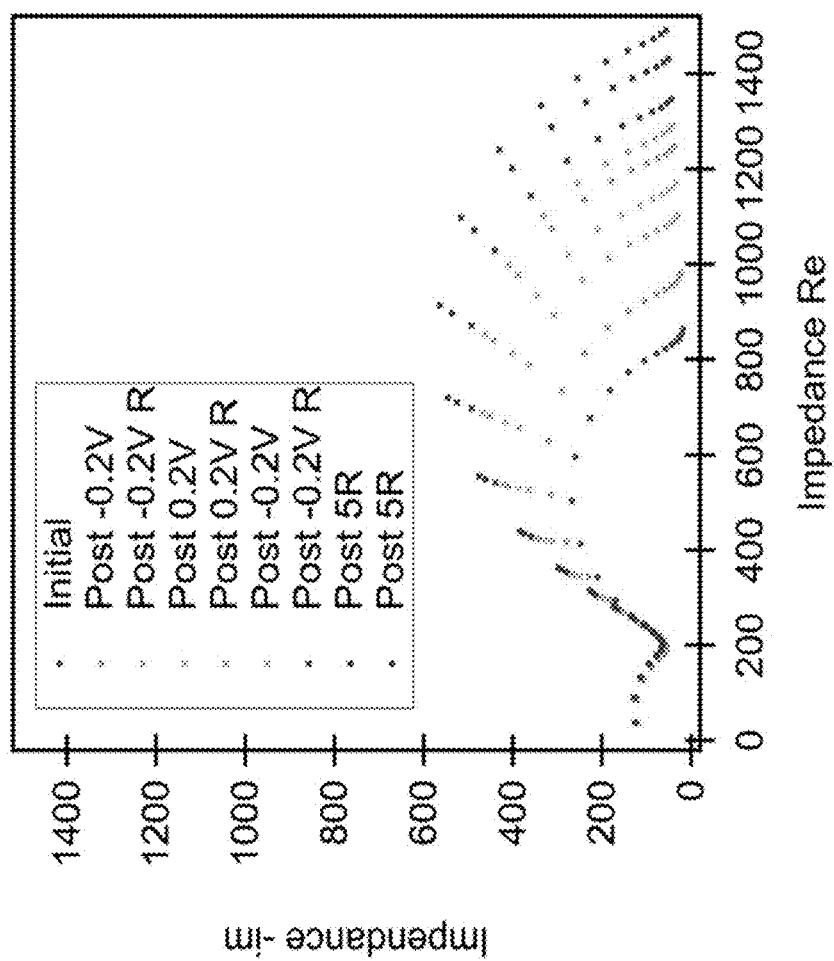
FIG. 27 shows collected electrochemical impedance spectroscopy (EIS) data, further illustrating reproducibility of data.

FIGS. 25-26 show example electrochemistry data collected using test cell such as test cell 150 having the electrical connection design shown in FIG. 19, demonstrating reproducibility of measurements collecting using the cell. FIG. 27 shows collected electrochemical impedance spectroscopy (EIS) data, further illustrating reproducibility of data.

Figure 28:
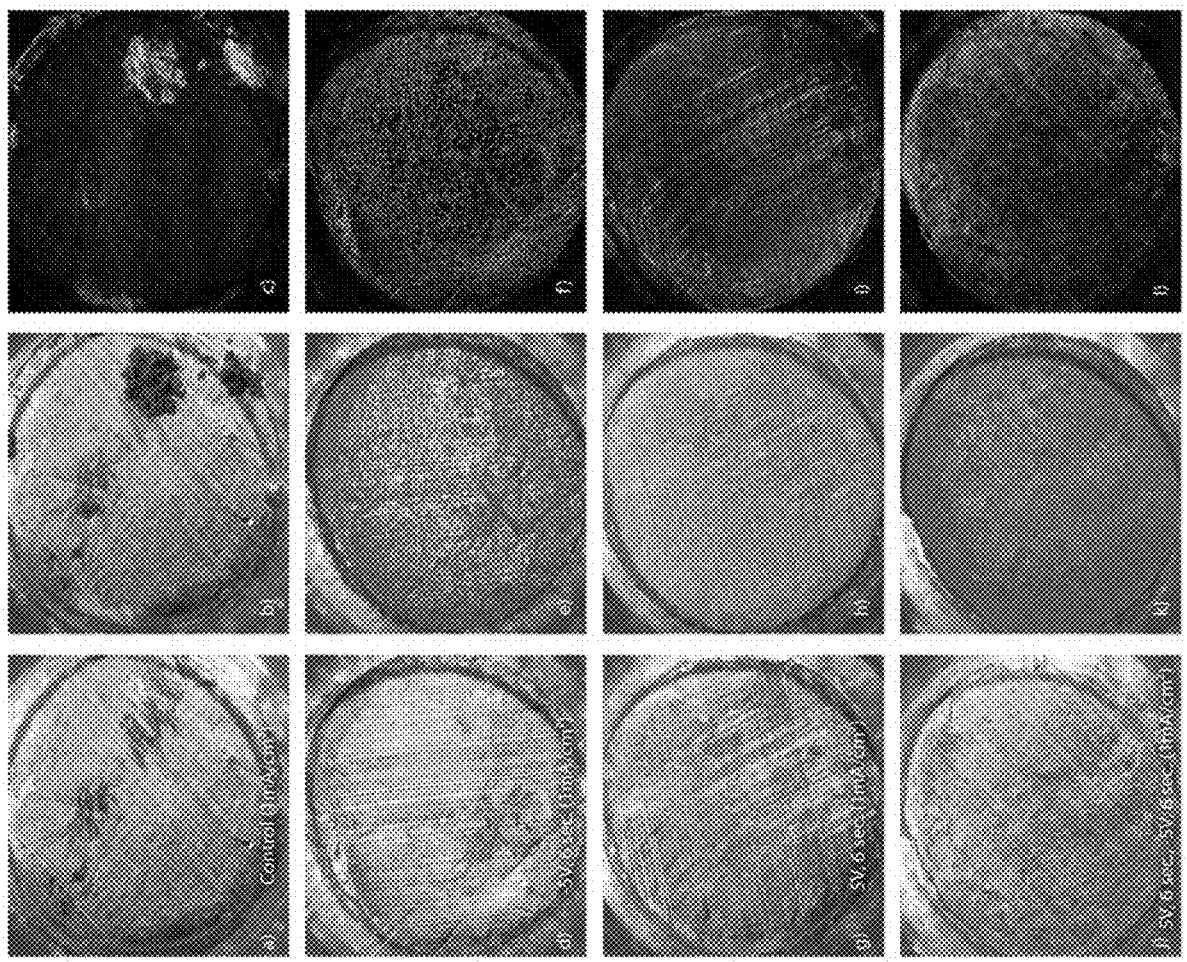
FIG. 28 shows example optical microscopy data collected using a test cell having the electrical connection design shown in FIG. 19.
Figure 29:
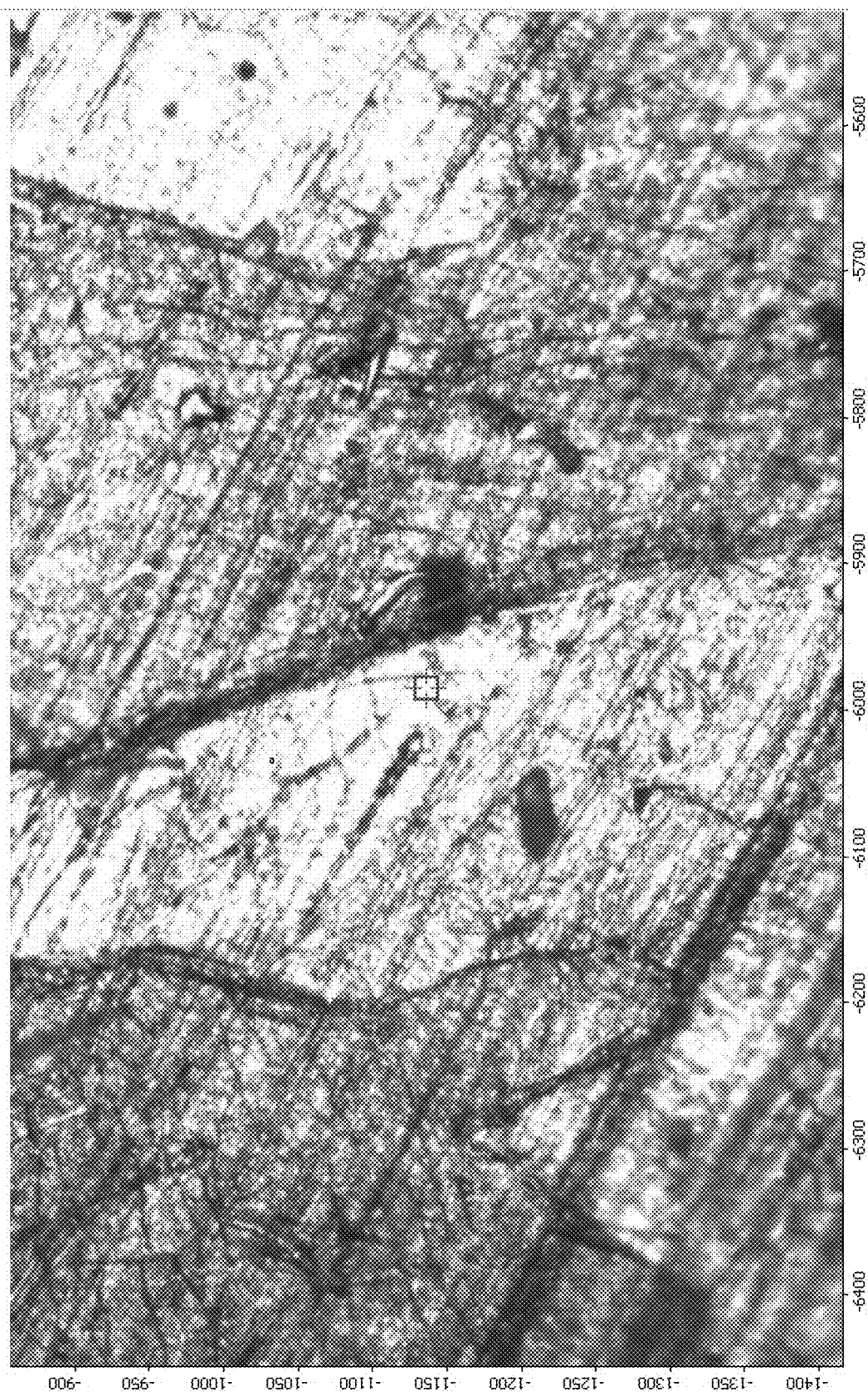
FIG. 29 is a high resolution image generated from an example testing method, showing grain boundaries of Lithium.
Figure 30:
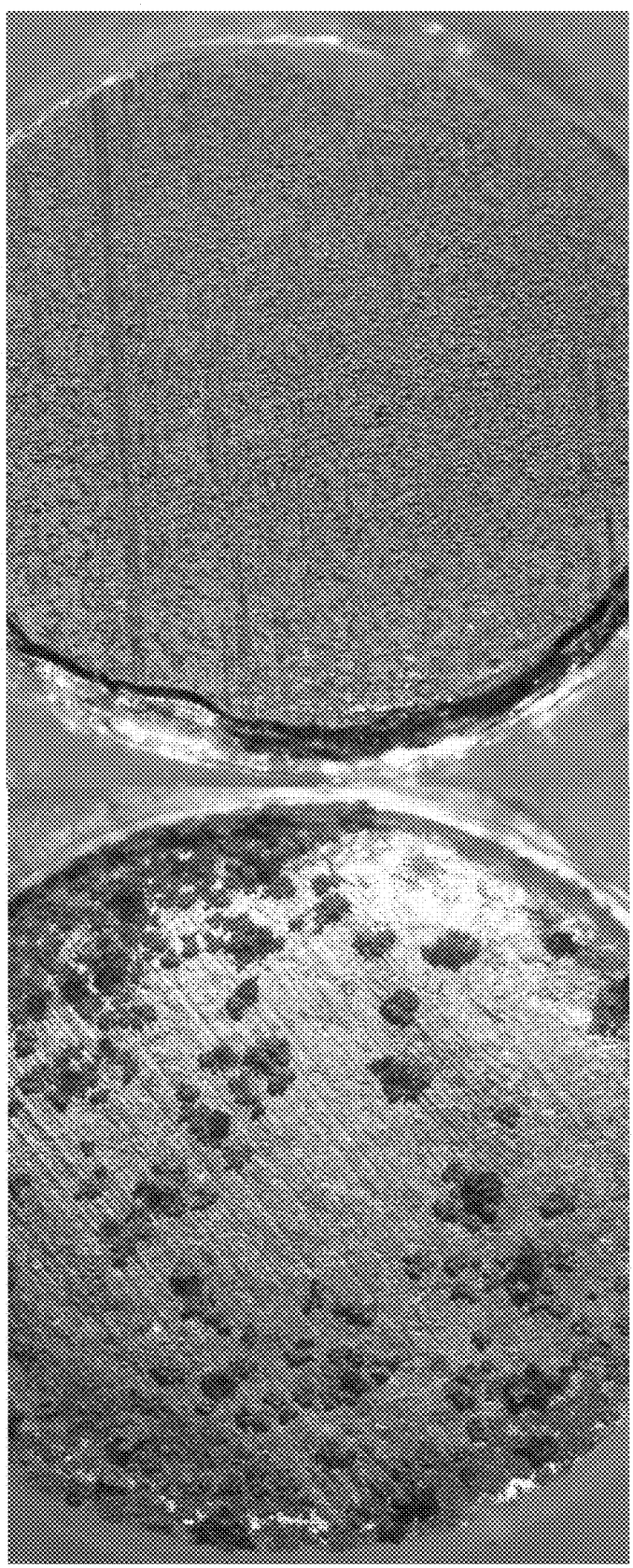
FIG. 30 shows two images generated from an example testing method, providing complete visualization of Lithium reaction surfaces.

FIG. 28 shows example optical microscopy data collected using test cell 100 having the electrical connection design shown in FIG. 19. FIG. 29 is a high resolution image showing grain boundaries of Lithium. FIG. 30 shows two images providing complete visualization of the reaction surfaces.

Figure 31:
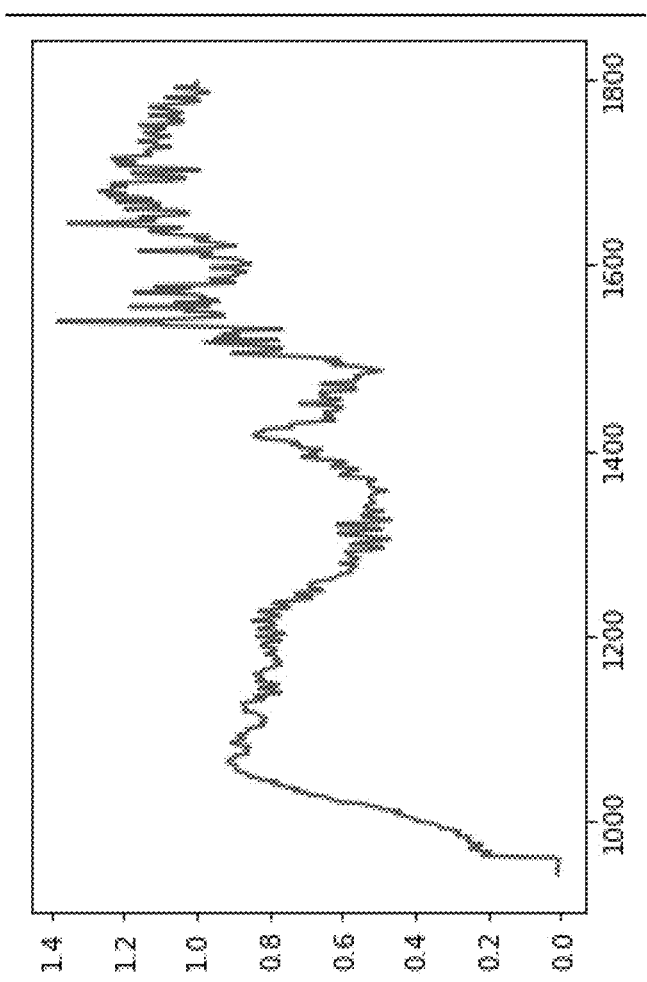
FIGS. 31-32 show example Fourier transform infrared FTIR (spectroscopy) data collected using the electrical connection design shown in FIG. 18, where
Figure 32:
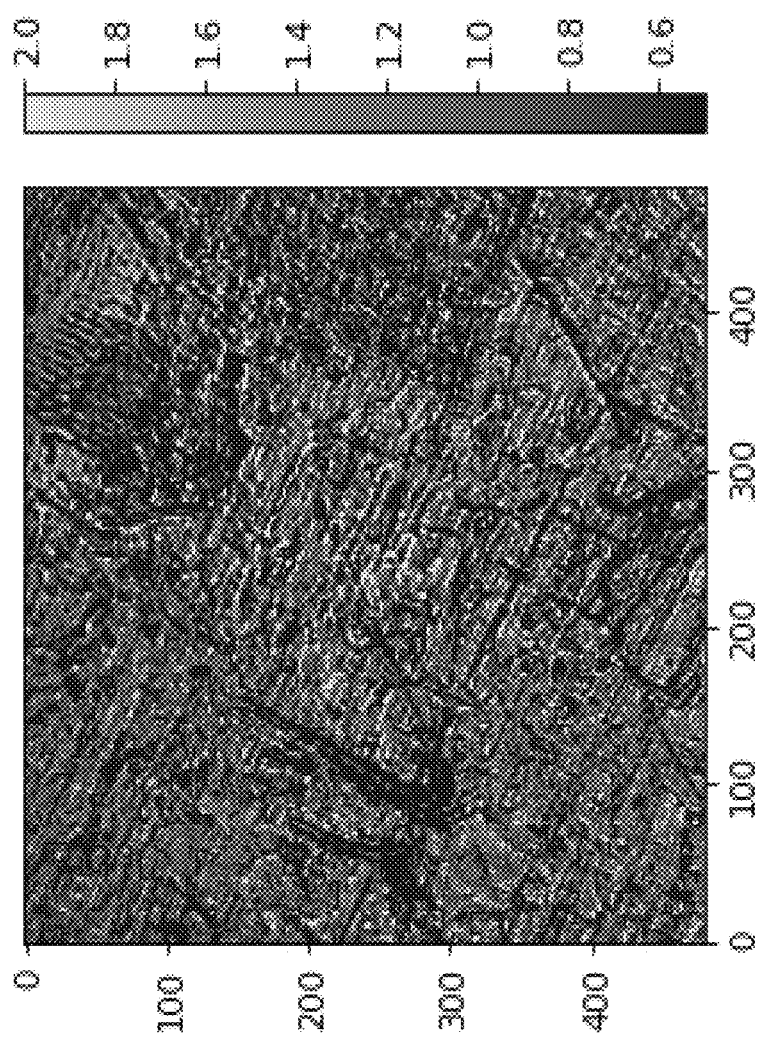

FIGS. 31-32 show example Fourier transform infrared FTIR (spectroscopy) data collected using a test cell having the electrical connection design shown in FIG. 18. FIG. 31 shows spectral data, while FIG. 32 shows mapping data.

Prior testing cells can be used in situ, but due to their large size (e.g., 4-6 in$^3$), have conventionally been confined to particular (height clearance) microscopes. Such sizes may not be suitable, e.g., with Ramen microscopes, which can be used in example operando testing systems using test cells disclosed herein. In general, the compact size provided by example test cells disclosed herein, the modularity of example designs, and the hermetically sealed electrical and/or fluid pathways provided by example test cells, allow example test cells to be used in environments that have not been possible with conventional test cell designs.

Example uses for test cells provided herein include, but are not limited to:

Electrochemistry; photoelectrochemistry; fuel cell testing (e.g., using fuel inlets/outlets, and optionally including an external pump); battery testing; air testing (air inlet/outlet may be used, and optionally including an external pump); liquid testing; solid testing Flow testing (fluid inlet/outlet may be used—may further include an external pump); General Chemical Reaction testing; Corrosion testing; Biological testing; Mechanical testing; Chemical testing; Electrochemical testing; Combustion testing (for example, cell material may be provided as stainless-steel); High Pressure and Low Pressure testing; Microfluidics testing (inlet/outlet used—may further include external pump); and biological testing (inlet/outlet used—may further include external pump.)

Other characterization techniques to use with example test cells disclosed herein include, but are not limited to:

Optical Microscopy; Gas chromatography (inlet/outlet used—may further include external pump); X-ray Analysis (preferably, window material is Kapton, Be or similar); X-ray Tomography; X-ray diffraction (XRD); X-ray fluorescence (XRF); Raman Spectroscopy (preferably, window material to $CaF_2$ or Similar); FTIR Spectroscopy (preferably, window material to $CaF_2$ or Similar); Ultraviolet-visible spectroscopy (UV-Vis) (preferably, cell base configured to have a back window for transmission analysis).

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Also, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor, or processors, with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as modules. The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those of ordinary skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, and process steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments discloses herein may be embodied directly in hardware, in a software module executed by a processor, or in a combination of the two. A software module may reside in RAM memory, flash memory, ROM memory, EPROM memory, EEPROM memory, registers, hard disk, solid state disk, optical media (e.g., CD-ROM), or any other form of transitory or non-transitory storage medium known in the art. An exemplary storage medium can be coupled to the processor such that the processor can read information from, and write information to, the storage medium. In the alternative, the storage medium can be integral to the processor. The processor and the storage medium may reside in an ASIC. The ASIC may reside in a user terminal. In the alternative, the processor and the storage medium may reside as discrete components in a user terminal.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12% 11% 10%, 9%, 8%, 7%, 6%, 5%, 4%, 3%, 2%, 1% 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

What is claimed is:

1. An operando system fabricated to comprise:
a housing assembly having mounted thereon:
(a) a test cell, wherein the test cell comprises,
an inner chamber mounted on the housing assembly;
a window coupled to said housing assembly, wherein the window allows viewing into or is trained on at least a portion of the inner chamber; and
a sample holder or a plurality of multiple modular sample holders operatively connected to an electrode or a modular insertable electrode,
at least one port for accommodating the electrode or modular insertable electrode and/or a wire conductor in communication with the inner chamber;
wherein the inner chamber is configured for receiving one or more samples undergoing a chemical and/or electrochemical reaction therein; and
wherein the port is sealable to hermetically seal the inner chamber;
(b) at least one analysis instrument operatively coupled to one or more of the electrodes or modular insertable electrode; and
(c) one or more of a camera or a microscope trained on the window and the sample holder or the plurality of multiple modular sample holders to view at least one chemical or electrochemical reaction on the sample holder or the plurality of multiple modular sample holders inside the inner chamber.

2. The operando system of claim 1, wherein said electrode or modular insertable electrode and/or wire conductor is at least partially disposed within the inner chamber.

3. The operando system of claim 1, further comprising:
one or more sample holders or plurality of multiple modular sample holders disposed within the inner chamber and in communication with the at least one port for at least partially housing the electrode or modular insertable electrode and/or wire conductor.

4. The operando system of claim 1, further comprising one or more compression fittings disposed outside of the inner chamber and coupled to said housing assembly, said compression fitting being in communication with the at least one port for at least partially housing the electrode or modular insertable electrode and/or wire conductor.

5. The operando system of claim 1, further comprising:
one or more sample holders or plurality of multiple modular sample holders disposed within the inner chamber and in communication with the at least one port for at least partially housing the sample holders or plurality of multiple modular sample holders, or the electrode or the modular insertable electrode and/or wire conductor;
one or more compression fittings disposed outside of the inner chamber and coupled to said housing assembly, said compression fitting being in communication with the at least one port for at least partially housing the electrode or modular insertable electrode; or
an electrode or modular insertable electrode disposed within one or more of said port, said electrode or modular insertable electrode holders, or said compression fittings.

6. The operando system of claim 4, wherein said electrode or modular insertable electrode and/or wire conductor comprises:
a sheath configured and disposed to seal one or more of said port, said sample holders or plurality of multiple modular sample holders, or said compression fittings; and
a conductive wire disposed within said sheath.

7. The operando system of claim 1, wherein the housing assembly further comprises:
(a) one or more additional ports in communication with the inner chamber for allowing passage of external materials therethrough;
(b) one or more fluid ports in fluid communication with the inner chamber for allowing passage of fluid therethrough, or
(c) both (a) and (b).

8. The operando system of claim 1, further comprising:
one or more fasteners for selectively sealing said one or more fluid ports.

9. The operando system of claim 1, further comprising:
a modular sample holder that can be separated from the housing assembly and selectively inserted into the inner chamber;
wherein the modular sample holder comprises:
one or more sample holders in communication with the at least one port for at least partially housing the electrode and/or conductive wire.

10. The operando system of claim 9, wherein the modular sample holder further comprises:
one or more sample holders.

11. The operando system of claim 9, wherein the modular sample holder is made from a corrosion-resistant material, or the modular sample holder is made from a metal.

12. The operando system of claim 9, wherein the at least one port for accommodating an electrode or modular insertable electrode and/or wire conductor is disposed on a side of the housing assembly.

13. The operando system of claim 12, further comprising:
a reference electrode disposed within said at least one port; and
a working electrode in communication with the inner chamber;
wherein the reference electrode and the working electrode are separated by a distance that is less than about 5 mm.

14. The operando system of claim 1, wherein said test cell is less than about 14 mm in thickness.

15. The operando system of claim 1, wherein the window provides an upper window;
further comprising:
an additional window providing a lower window disposed within the inner chamber and opposing the upper window;
wherein the inner chamber is disposed between the upper and lower windows.

16. The operando system of claim 1, wherein the window is optically transparent or translucent.

17. The operando system of claim 1, further comprising:
a computer in operable communication with one or more of said analysis instrument, camera, and/or microscope.

18. The operando system of claim 1, further comprising at least one spectroscopy instrument mounted on the housing assembly.

19. A method for operando testing, comprising:
(a) providing the operando system of claim 17;
(b) initiating a chemical and/or electrochemical reaction within the inner chamber; and
(c) collecting data from the reaction via the one or more electrodes or modular insertable electrode and the camera or microscope and transmitting the data to the computer.

* * * * *